(12) United States Patent
Newman et al.

(10) Patent No.: US 11,817,950 B2
(45) Date of Patent: Nov. 14, 2023

(54) AI MEANS FOR MITIGATING FAULTED MESSAGE ELEMENTS IN 5G/6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(73) Assignee: Ultralogic 6G, LLC, Palos Verdes, CA (US)

( * ) Notice: Subject to any disclaimer, the term of this patent is extended or adjusted under 35 U.S.C. 154(b) by 0 days.

(21) Appl. No.: 17/991,149

(22) Filed: Nov. 21, 2022

(65) Prior Publication Data
US 2023/0110599 A1 Apr. 13, 2023

Related U.S. Application Data

(63) Continuation of application No. 17/851,722, filed on Jun. 28, 2022, now Pat. No. 11,522,638, which is a continuation of application No. 17/579,755, filed on Jan. 20, 2022, now Pat. No. 11,405,131.
(Continued)

(51) Int. Cl.
| | |
|---|---|
| *H04L 1/00* | (2006.01) |
| *H04L 1/20* | (2006.01) |
| *H04B 17/17* | (2015.01) |
| *H04B 17/18* | (2015.01) |
| *H04B 17/29* | (2015.01) |
| *H04B 17/336* | (2015.01) |
| *H04W 76/18* | (2018.01) |

(Continued)

(52) U.S. Cl.
CPC .......... *H04L 1/0026* (2013.01); *H04B 17/17* (2015.01); *H04B 17/18* (2015.01); *H04B 17/29* (2015.01); *H04B 17/336* (2015.01); *H04L 1/0003* (2013.01); *H04L 1/0015* (2013.01); *H04L 1/0061* (2013.01); *H04L 1/08* (2013.01); *H04L 1/206* (2013.01); *H04L 5/0053* (2013.01); *H04W 76/18* (2018.02); *H04L 43/0829* (2013.01)

(58) Field of Classification Search
CPC .... H04L 1/0026; H04L 1/0003; H04L 1/0061
USPC .......................................................... 714/26
See application file for complete search history.

(56) References Cited

U.S. PATENT DOCUMENTS

| 8,059,763 | B1 | 11/2011 | Varnica | |
| 9,838,896 | B1 * | 12/2017 | Barnickel | ............. H04W 4/027 |

(Continued)

*Primary Examiner* — Fitwi Y Hailegiorgis

(57) ABSTRACT

Artificial Intelligence (AI) can rapidly evaluate a faulted message in 5G or 6G, calculate a likelihood that each message element is faulted, and optionally suggest a most probable corrected version for each of the likely faulted message elements. To do so, the AI takes in numerous factors besides the message itself, such as the modulation quality of each message element, the proximity and quality of a nearest demodulation reference, a signal-to-noise ratio of the message element, a measure of current electromagnetic noise during the message element, an expected format or expected codewords based on prior messages or convention, and other factors. The AI model can then provide guidance as to mitigation, such as choosing whether to request a retransmission or attempting to vary the likely faulted message elements. The AI model can be adapted to fixed-site computers or to the more limited computers of a mobile user device.

20 Claims, 10 Drawing Sheets

Related U.S. Application Data

(60) Provisional application No. 63/282,770, filed on Nov. 24, 2021, provisional application No. 63/281,847, filed on Nov. 22, 2021, provisional application No. 63/281,187, filed on Nov. 19, 2021, provisional application No. 63/280,281, filed on Nov. 17, 2021, provisional application No. 63/230,926, filed on Aug. 9, 2021, provisional application No. 63/159,238, filed on Mar. 10, 2021, provisional application No. 63/159,195, filed on Mar. 10, 2021, provisional application No. 63/157,090, filed on Mar. 5, 2021, provisional application No. 63/151,270, filed on Feb. 19, 2021.

(51) Int. Cl.
*H04L 1/08* (2006.01)
*H04L 5/00* (2006.01)
*H04L 43/0829* (2022.01)

(56) References Cited

U.S. PATENT DOCUMENTS

| | | |
|---|---|---|
| 2007/0089036 A1 | 4/2007 | Jiang |
| 2007/0089037 A1 | 4/2007 | Jiang |
| 2008/0123788 A1 | 5/2008 | Wongwirawat |
| 2009/0046771 A1 | 2/2009 | Abe |
| 2010/0097939 A1 | 4/2010 | Yoneta |
| 2012/0311409 A1 | 12/2012 | Pedersen |
| 2013/0163656 A1 | 6/2013 | Sakamoto |
| 2013/0346826 A1 | 12/2013 | Zopf |
| 2014/0056342 A1 | 2/2014 | Baker |
| 2014/0376358 A1 | 12/2014 | Eder |
| 2015/0139350 A1 | 5/2015 | Sugihara |
| 2016/0080109 A1 | 3/2016 | Lee |
| 2017/0019210 A1 | 1/2017 | Yu |
| 2017/0134193 A1 | 5/2017 | Sugihara |
| 2017/0288912 A1 | 10/2017 | Rahmati |
| 2017/0311300 A1 | 10/2017 | Stanwood |
| 2017/0331734 A1 | 11/2017 | Cariou |
| 2019/0025813 A1* | 1/2019 | Cella .............. H04B 17/309 |
| 2019/0121350 A1 | 4/2019 | Cella |
| 2020/0366409 A1 | 11/2020 | Xu |
| 2020/0394090 A1 | 12/2020 | Urban |
| 2021/0250049 A1 | 8/2021 | Gabrys |
| 2021/0273651 A1 | 9/2021 | Haftbaradaran |
| 2021/0328598 A1 | 10/2021 | Annamraju |
| 2021/0383207 A1 | 12/2021 | Beery |

\* cited by examiner

AI MEANS FOR MITIGATING FAULTED MESSAGE ELEMENTS IN 5G/6G

PRIORITY CLAIMS AND RELATED APPLICATIONS

This application is a continuation of U.S. patent application Ser. No. 17/851,722, entitled "Artificial Intelligence Fault Localization in 5G and 6G Messages", filed Jun. 28, 2022, which is a continuation of U.S. patent application Ser. No. 17/579,755, entitled "AI-Based Error Detection and Correction in 5G/6G Messaging", filed Jan. 20, 2022, which claims the benefit of U.S. Provisional Patent Application Ser. No. 63/151,270, entitled "Wireless Modulation for Mitigation of Noise and Interference", filed Feb. 19, 2021, and U.S. Provisional Patent Application Ser. No. 63/157,090, entitled "Asymmetric Modulation for High-Reliability 5G Communications", filed Mar. 5, 2021, and U.S. Provisional Patent Application Ser. No. 63/159,195, entitled "Asymmetric Modulation for High-Reliability 5G Communications", filed Mar. 10, 2021, and U.S. Provisional Patent Application Ser. No. 63/159,238, entitled "Selecting a Modulation Table to Mitigate 5G Message Faults", filed Mar. 10, 2021, and U.S. Provisional Patent Application Ser. No. 63/230,926, entitled "Error Detection and Correction in 5G by Modulation Quality", filed Aug. 9, 2021, and U.S. Provisional Patent Application Ser. No. 63/280,281, entitled "Error Detection and Correction in 5G by Modulation Quality in 5G/6G", filed Nov. 17, 2021, and U.S. Provisional Patent Application Ser. No. 63/281,187, entitled "Error Correction by Merging Copies of 5G/6G Messages", filed Nov. 19, 2021, and U.S. Provisional Patent Application Ser. No. 63/281,847, entitled "Retransmission of Selected Message Portions in 5G/6G", filed Nov. 22, 2021, and U.S. Provisional Patent Application Ser. No. 63/282,770, entitled "AI-Based Error Detection and Correction in 5G/6G Messaging", filed Nov. 24, 2021, all of which are hereby incorporated by reference in their entireties.

FIELD OF THE INVENTION

Disclosed are artificial intelligence-based systems and methods for detecting and correcting corrupted wireless messages.

BACKGROUND OF THE INVENTION

Transmission faults are inevitable in wireless communication, due to noise, interference, attenuation, and other distortions. Faulted messages may lead to retransmission requests and other delays. In 5G and 6G, faulted messages are detected according to an error-detection code in the message, without determining which message elements are faulted. What is needed is means for determining which resource elements of a message are faulted, and means for repairing those faults.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a computer containing software comprising an artificial intelligence (AI) model, the computer configured to: take as input a plurality of input data comprising: a received wireless message, the message comprising message elements, each message element modulated according to a modulation scheme, the modulation scheme comprising a plurality of predetermined amplitude modulation levels or a plurality of predetermined phase modulation levels or both; and a modulation quality of each message element, the modulation quality based on an amplitude difference between an amplitude of the message element and one of the predetermined amplitude modulation levels of the modulation scheme, or a phase difference between a phase of the message element and one of the predetermined phase modulation levels of the modulation scheme, or both; and determine, as output: for each message element of the message, a likelihood that the message element is faulted; and a most probable number of faulted message elements in the message.

In another aspect, there is non-transitory computer-readable media in a computer, the media containing an artificial intelligence model and instructions that, when implemented in a computing environment, cause a method to be performed, the method comprising: receiving, as input, a message comprising message elements, each message element modulated according to a modulation scheme comprising predetermined modulation levels; providing, as output, for each of the message elements, a likelihood that the message element is faulted; and providing, as further output, for each message element, a most probable correct version of each faulted message element.

In another aspect, there is a method for a computer, containing an artificial intelligence model, to correct a faulted message comprising message elements, the method comprising: determining, according to a modulation of the message elements, which message elements of the faulted message are likely faulted; sequentially preparing a plurality of altered messages, wherein each altered message comprises the message with one of the likely faulted message elements altered to a different modulation; and determining whether each of the altered messages is faulted.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
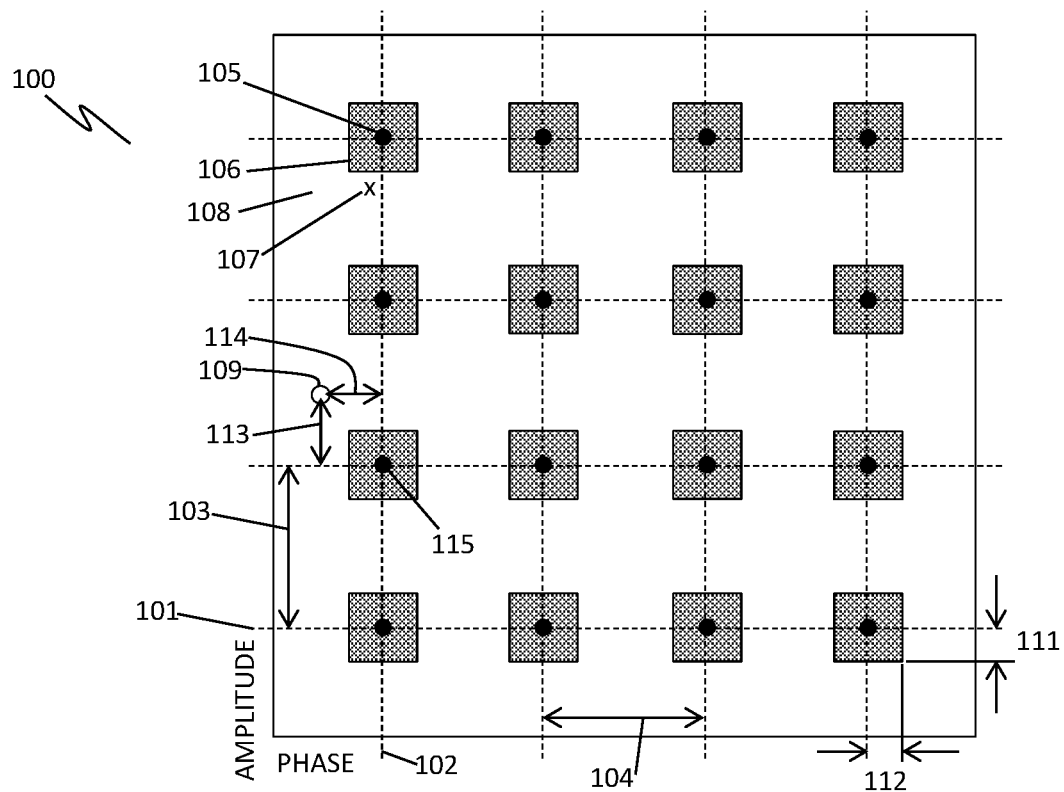
FIG. 1A is a schematic showing an exemplary embodiment of a modulation table for 16QAM, according to some embodiments.

Disclosed herein are procedures for a wireless receiver to detect, localize, and correct individual errors in a received message using artificial intelligence, thereby enhancing reliability and minimizing retransmission delays. Systems and methods disclosed herein (the "systems" and "methods", also occasionally termed "embodiments" or "arrangements", generally according to present principles) can provide urgently needed wireless communication protocols to reduce retransmission burdens, improve reliability, and reduce overall delays in networks such as 5G and 6G networks, according to some embodiments. Commonly in wireless communication, interference or noise may distort one or more message elements, resulting in a corrupted message as received. Such a message is generally rejected by the receiving entity because the message disagrees with its error-detection code (EDC), such as a CRC (cyclic redundancy code) or a parity construct. Lack of an acknowledgement then prompts a retransmission, which takes extra time and extra signaling. However, the corrupted message contains a great deal of information despite the fault, especially if the fault is restricted to one or a few resource elements, and even the faulted message elements may contain valuable information to assist in error mitigation.

Procedures are disclosed for developing a predictive AI model for localizing faults to one or a few message elements, and optionally for directing subsequent mitigation based on input parameters such as the noise and interference background, information about the message and any retransmissions, any demodulation references proximate to the message, and optionally certain features that the receiving entity may anticipate in the message, for example. Also disclosed are methods for evaluating the modulation quality of each element of a message, and for merging a message with its retransmission to exclude the faulted message elements. The systems and methods disclosed herein can provide means for detecting one or more faulted resource elements in a message, and efficiently determining the correct value of those resource elements, thereby providing a low-latency and high-reliability solution to message fault problems, according to some embodiments.

Terms used herein generally follow 3GPP (Third Generation Partnership Project) usage, but with clarification where needed to resolve ambiguities. As used herein, "5G" represents fifth-generation and "6G" sixth-generation wireless technology. A network (or cell or LAN or local area network or the like) may include a base station (or gNB or generation-node-B or eNB or evolution-node-B or access point) in signal communication with a plurality of user devices (or UE or user equipment or nodes or terminals) and operationally connected to a core network (CN) which handles non-radio tasks, such as administration, and is usually connected to a larger network such as the Internet. "Receiver" is to be interpreted broadly, including processors accessible by the recipient and configured to perform calculations on received signals or messages. Embodiments may include direct user-to-user ("sidelink") communication such as V2V (vehicle-to-vehicle) communication, V2X (vehicle-to-anything), X2X (anything-to-anything, also called D2D or device-to-device) and base station communications or V2N (vehicle-to-network). "Vehicle" is to be construed broadly, including any mobile wireless communication device. The time-frequency space is generally configured as a "resource grid" including a number of "resource elements", each resource element being a specific unit of time termed a "symbol time", and a specific frequency and bandwidth termed a "subcarrier" (or "subchannel" in some references). Each subcarrier can be independently modulated to convey message information. Thus a resource element, spanning a single symbol in time and a single subcarrier in frequency, is the smallest unit of a message. "RNTI" (radio network temporary identity) or "C-RNTI" (cell radio network temporary identification) is a network-assigned user code. "QoS" is quality of service, or priority. "QCI" (QoS class identifier) defines various performance levels. "QPSK" (quad phase-shift keying) is a modulation scheme with two bits per message element, and "16QAM" (quadrature amplitude modulation with 16 states) is a modulation scheme with four bits per message element. "AI" (artificial intelligence) is computer-assisted decision-making, usually within a myriad of conflicting factors. "ML" (machine learning) is automated analysis of examples to develop computer means for recognizing similar examples thereafter. "SNR" (signal-to-noise ratio) and "SINK" (signal-to-interference-and-noise ratio) are treated as equivalent herein.

In addition, the following terms are used herein. In references, each modulated resource element of a message is referred to as a "symbol", but this may be confused with the same term for a time interval. Therefore, each modulated reference element of a message is referred to as a "modulated message resource element" or a "message element" in examples below. A "demodulation reference" is a set of modulated resource elements that exhibit levels of a modulation scheme (as opposed to conveying data), and each resource element of a demodulation reference is termed a "reference element" herein. A message may be configured "time-spanning" by occupying sequential symbols at a single frequency, or "frequency-spanning" on multiple subcarriers at a single symbol time (also called "frequency-first" if the message continues on multiple symbol times). References often conflate those terms with "TDD" (time-division duplexing) and "FDD" (frequency-division duplexing) which refer to the order of whole messages, not to the configuration of each message in the time-frequency space. A device "knows" something if it has the relevant information. A device "listens" or "monitors" a channel or frequency if the device receives, or attempts to receive, signals on the channel or frequency. A message is "faulted" or "corrupted" if one or more bits of the message have been changed relative to the original message. "Receptivity" is the quality of reception of a message. A "modulation scheme" is one or more predetermined amplitude levels and one or more predetermined phase levels, which together define an array of "predetermined modulation states of the modulation scheme" or more simply "states", each state representing a resource element modulated according to one of the amplitude levels and one of the phase levels. The "amplitude deviation" of a message element is the difference between its amplitude and the closest amplitude level of the modulation scheme, and likewise the "phase deviation" of a message element is the difference between its phase and the closest phase level of the modulation scheme. The "modulation quality" is a measure of how close the modulation of a message element is to the closest amplitude and phase levels of the modulation scheme, or equivalently how close the modulation of the message element is to the closest state of the modulation scheme. An "EDC" (error-detecting code) is a field in a message configured to detect faults, such as a CRC or a parity construct or the like. If one or more elements of a message have been changed when received, the message fails the "EDC test", or more specifically, the embedded error-detection code disagrees with the bit-level content of the message. A message is "unicast" if it is addressed to a specific recipient, and "broadcast" if it includes no recipient address. Transmissions are "isotropic" if they provide roughly the same wave energy in all horizontal directions. An "AI structure" is a software construct, such as a neural net, including adjustable variables that can be trained to solve complex problems. An "AI model" is an AI structure in which the variables have been at least partially trained according to a particular problem, and which can provide outputs or predictions based on input parameters.

When a message is corrupted as received, the fault may have occurred during the modulation step in the transmitter, or in propagation through the air, or at the receive side, and may be due to electronic noise or external interference or atmospheric absorption or scattering or reflection of the electromagnetic wave, to name just a few possible sources of message faults. Amplitude or phase distortion can cause the receiver to incorrectly demodulate those message elements, in which case the message fails the EDC test. Upon detecting a faulted message, the recipient in 5G or 6G can do one of several things. If the recipient knows that the message is intended for it, such as a base station that has scheduled an uplink message at a particular time or a user device with a scheduled downlink message, the recipient can request a retransmission responsive to the fault. For most downlink control messages, however, the user device does not know the time or frequency or length of a message, or even if the message is intended for that user device, because the downlink in 5G/6G generally relies on a "blind search" for user devices to locate their control messages, and a faulted message would appear as not intended for that user device. Therefore, user devices can request a retransmission after failing to receive an expected message after a certain amount of time, or by not transmitting an acknowledgement, among other options. In each case, the time involved in responding to a faulted message is substantial, especially for critical low-latency applications such as remote surgery and traffic safety.

In contrast, the disclosed systems and methods for message fault correction may be carried out in a fraction of the retransmission time, thereby repairing the message, avoiding the retransmission delays, enhancing network reliability, and avoiding adding to the electromagnetic background by avoiding the retransmission, among other benefits, according to some embodiments. The receiver can determine the modulation quality of each message element by measuring how far the amplitude and phase of the message element deviate from the closest amplitude and phase levels of the modulation scheme, or equivalently, from the closest state of the modulation scheme. The receiver can then alter the "suspicious" message elements that have a modulation quality lower than a threshold value. Equivalently, the receiver can alter suspicious elements that have an amplitude or phase deviation larger than a predetermined limit. The receiver can then alter the suspicious elements (or, more specifically, the receiver can alter which modulation state the message element is assigned to), and can test the altered version against the error-detection code. By altering the state assignments of each suspicious element of the message, the receiver may search for the correct version of each message element. The receiver can also determine a "direction" according to the type of amplitude and phase deviation relative to the closest state of the modulation scheme, further guiding the mitigation. If the receiver receives a retransmission of the same message, the receiver can then merge the two versions by selecting whichever message element has the higher modulation quality, thereby eliminating most or all faulted message elements from the merged version. In addition, the receiver can determine a message portion that contains all of the suspicious elements, and then can request that only the indicated portion be retransmitted, thereby saving further time. For complex communication environments with multiple competing priorities, an AI-based algorithm can be prepared for fault mitigation by accounting for many complex factors, and can be adjusted or "tuned" to optimize a network operation parameter, for example. With these methods, receivers can greatly reduce most types of communication errors, according to some embodiments.

The following examples disclose a modulation quality of each message element. The modulation quality is based on how far the modulation of the message element deviates from the closest state of the modulation scheme. Faulted message elements generally have a much larger modulation deviation than the correctly received elements, and therefore a lower modulation quality, due to the random distortions of noise and interference. To mitigate the faults, the receiver can alter the message elements that have the lowest modulation quality, while testing each altered version of the message against the error-detection code.

FIG. 1A is a schematic showing an exemplary embodiment of a modulation table, according to some embodiments. A modulation table 100 represents the amplitude levels, phase levels, and states of a modulation scheme. As depicted in this non-limiting example, four amplitude levels 101 are shown as dotted horizontal lines, and four phase levels 102 are shown as dotted vertical lines. Each state 105 of the modulation scheme is shown as a dot at an intersection between one of the amplitude levels 101 and one of the phase levels 102. Thus, each state is modulated according to both the amplitude level and the phase level indicated. The amplitude levels 101 are spaced apart by an amplitude step 103, and the phase levels 102 are spaced apart by a phase step 104. Therefore, "adjacent" states are separated by one amplitude level or one phase level, or both. Phase is a circular parameter, which implies that the highest and lowest phase levels are separated by one phase step 104, although that may not be obvious in this type of chart.

The modulation scheme in the depicted case is 16QAM, with four amplitude levels 102 and four phase levels 103 and sixteen states indicated by dots 105. Around each state 105 is a rectangular form in dark stipple representing a "good-modulation zone" 106 (or "good-mod" in figures below) with high modulation quality. For the rectangular good-modulation zones 106, the area is defined by the amplitude level 101 plus or minus a predetermined amplitude range 111, and by the phase level 102 plus or minus a predetermined phase range 112. A message element that is modulated in amplitude and phase so as to fall within (or occupy) one of the good-modulation zones 106, is assigned to the closest state 105 of the modulation scheme, for purposes of demodulation.

The exterior white space 108 is a "bad-modulation zone" (or "bad-mod") in which the state of the message element is "suspicious" and possibly incorrect due to its low modulation quality. For example, a particular message element is modulated in amplitude and phase according to a small "x" 107 which is in the bad-modulation zone 108. Although the phase modulation of the message element x 107 is within the phase range 112 of one of the phase levels 102 of the modulation scheme, the amplitude modulation is not within the amplitude range 111 of any of the amplitude levels 101, and therefore the message element 107 has bad-modulation quality and is suspicious. For demodulation, the message element 107 may be assigned to the closest state 105. The figure shows another message element's modulation, as an "o" 109, which has an amplitude deviation 113 relative to the nearest amplitude level 101, and a phase deviation 114 relative to the nearest phase level 102. The amplitude deviation 113 for this message element 109 is greater than the amplitude range 111 required for good-modulation. The phase deviation 114 is also greater than the phase range 112. Hence, the message element 109 is flagged as low modulation quality and suspicious. Although it may be assigned to the nearest state 115 initially, the assignment of this bad-modulation element may be varied later, if the message is found to be corrupted.

To determine whether the message is corrupted, the message may be checked against an error-detection code which is normally embedded in or appended to the message. If the message agrees with the error-detection code, the tentative assignment of the bad-modulation message elements is confirmed, and the message has been successfully demodulated. If the message disagrees with the error-detection code, the message has failed the EDC test and is corrupted. The receiver may attempt to recover the message by altering the states assigned to the suspicious message elements, that is, re-assigning them to different states of the modulation scheme, while testing each altered message version against the error-detection code.

In some cases, the suspicious message element may happen to be one of the elements of the error-detection code. In that case, the suspicious element is altered in the same way as any other message element. However, when determining whether the altered message is corrupted, the receiver uses the altered error-detection code (not the as-received code) to compare with the bit-level content of the rest of the message. Thus a fault in the error-detection code may be mitigated in the same way as a fault elsewhere in the message.

While the figure shows the 16QAM modulation scheme, many other modulation schemes are possible. For example, 64QAM and 256QAM involve additional phase and amplitude levels, whereas QPSK has four phase levels and only a single amplitude level. The "difference" between a modulated message element 109 and a state 105 of the modulation scheme includes a difference in phase for QPSK, or a difference in phase and amplitude for the QAM modulation schemes. In QPSK, demodulation of a message element includes finding which of the four states of QPSK is closest to the phase of the message element. In QAM schemes, demodulation involves selecting the amplitude level of the modulation scheme closest to the amplitude of the message element, and selecting the phase level of the modulation scheme that is closest to the phase of the message element. In each case, the methods disclosed herein for 16QAM can be applied straightforwardly to each modulation scheme, according to some embodiments.

The figure, and the other examples to follow, are presented according to a standard modulation scheme in which the amplitude and phase are modulated separately. The receiver demodulates a message by determining the amplitude and phase of each message element separately, and compares each amplitude and phase value to the amplitude and phase levels recorded in the calibration set. In other embodiments, however, the message may employ pulse-amplitude modulation (PAM), in which two amplitude-modulated signals are added with a 90-degree phase offset between them. Upon receipt, the demodulator then picks out the "real" (zero offset) and "imaginary" (90-degree offset) signals for each of the reference elements and message elements. (The two phase modulations are also sometimes called the "I" or in-phase component and the "Q" or quadrature component.) The receiver then prepares a "constellation" of modulation states from the measured real and imaginary values of the reference elements, each state having a particular real amplitude and a particular imaginary amplitude. The receiver then demodulates the message elements by comparing their real and imaginary values to the real and imaginary levels of the constellation, and thereby determines the modulation state of each message element, as desired. For example, 16QAM with PAM modulation has four real amplitudes and four imaginary amplitudes, which are combined in each message element to yield 16 states overall. The constellation of PAM is equivalent to the calibration set of regular amplitude-phase modulation. The extrapolation and interpolation methods described above are straightforwardly applicable to the real-imaginary modulation states of PAM. Many other modulation technologies and schemes exist. As long as the modulation scheme involves modulating the phase and (optionally) the amplitude of an electromagnetic wave, it is immaterial which modulation technology is employed. For consistency and clarity, the examples refer to regular amplitude and phase modulation separately. The principles disclosed herein may apply to each of these modulation technologies, as will be apparent to artisans with ordinary skill in the art after reading the present disclosure.

Figure 1B:
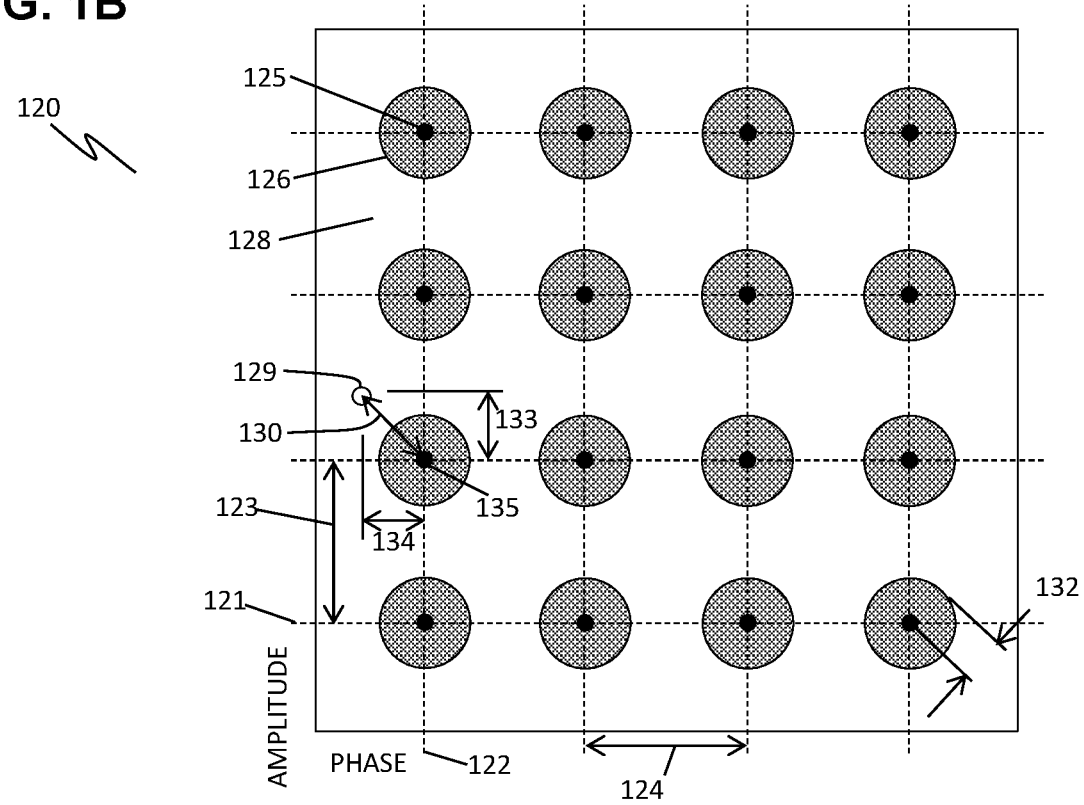
FIG. 1B is a schematic showing another exemplary embodiment of a modulation table for 16QAM, according to some embodiments.

FIG. 1B is a schematic showing another exemplary embodiment of a modulation table for 16QAM, according to some embodiments. As depicted in this non-limiting example, the modulation table 120 may include four amplitude levels 121 separated by an amplitude step 123, and four phase levels 122 separated by a phase step 124, for sixteen states 125 total. Each state 125 is surrounded in this case by a circular good-modulation zone 126, each with a radius 132 as indicated. The exterior white space 128 represents bad-modulation. A particular message element "o" 129 has an amplitude deviation 133 and a phase deviation 134, and is at a distance 130 (in phase-amplitude space) from the nearest state 135 of the modulation scheme. If that distance 130 is less than the radius 132 of the good-modulation zone, the message element 129 is assigned to the nearest state 135 and is allocated to "good-modulation quality". If the distance 130 is greater than the radius 132, then the message element 129 may still be assigned to the nearest state 135, but may be flagged as suspicious or "bad-modulation quality" for later mitigation, if needed. Thus the radius 132 of the good-modulation zones 126 is a predetermined limit or threshold separating the message elements into categories, such as high modulation quality and low modulation quality, according to the distance 130 of each message element's modulation from the closest state of the modulation scheme.

The units of phase are generally different from those for amplitude, which may complicate calculating the distance 130. Therefore, for ease of calculation, the measurements may be made unitless by dividing each amplitude deviation 133 by the amplitude step 123, and dividing each phase deviation 134 by the phase step 124. Good-modulation quality message elements then have a distance 130 less than a predetermined limit or a modulation quality greater than a threshold value, whereas bad-modulation message elements have a larger distance or lower modulation quality. The threshold value or predetermined limit may be set empirically or theoretically, for example. In some embodiments, the threshold value or predetermined limit may be set by comparing the modulation quality of message elements that pass or fail the EDC test, and adjusting the threshold value or predetermined limit so that, on average, most or all message elements that are incorrectly demodulated are allocated to bad-modulation according to the distance, while message elements that are correctly demodulated are allocated to good-modulation. In other embodiments, the threshold value or predetermined limit may be adjusted up or down according to changing conditions, such as an increase or decrease in background noise or interference. In further embodiments, the threshold value or predetermined limit may be adjusted to minimize the average latency of messages, including any retransmission delays for corrupted messages, based on a sample of message latencies for example.

Figure 2:
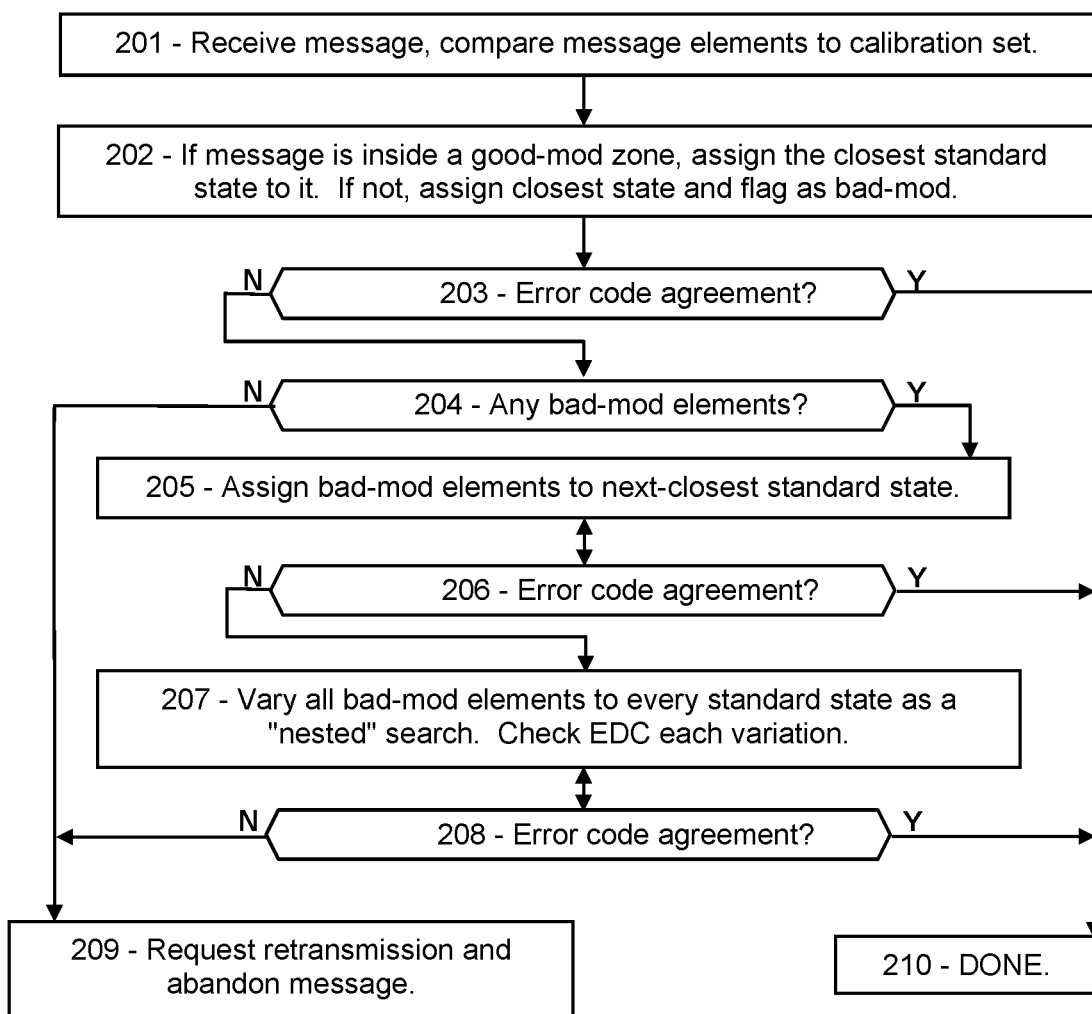
FIG. 2 is a flowchart showing an exemplary embodiment of a process for detecting and correcting message errors, according to some embodiments.

FIG. 2 is a flowchart showing an exemplary embodiment of a process for detecting and correcting message errors, according to some embodiments. As depicted in this non-limiting example, a receiver may receive a message at 201 and compare each message element to a calibration set that includes all of the amplitude levels and phase levels of the modulation scheme, as provided by a proximate demodulation reference, for example. At 202, the receiver may assign each message element to the closest state of the modulation scheme based on the modulation of that message element, that is, the amplitude of the message element is closest to one of the amplitude levels and the phase of the message element is closest to one of the phase levels, and those amplitude and phase levels determine the matching state. In addition, the receiver may categorize the modulation quality of each message element, according to the distance from the message element's modulation to the closest state, as good-mod or bad-mod depending on which zone the message element occupies.

At 203, the receiver can compare the message to an error-detection code, and if there is agreement, the task is done at 210. If the message fails the error detection code, then at 204 the receiver can determine whether the message includes any bad-modulation message elements. If all of the message elements are good-modulation, yet the message still fails the EDC test, then the receiver can request a retransmission or abandon the message, depending on convention, at 209. If there are some bad-modulation elements, then at 205, the receiver can attempt to fix the fault and recover the message by altering the bad-mod elements to their second-closest state instead of the closest one. (The "second-closest" state is the state that is closer to the message element's modulation than any other state of the modulation scheme, other than the closest one.) At 206, the altered message is tested against the error-detection code for each alteration, and if there is agreement, the task is done. If not, the receiver may continue altering any remaining bad-mod elements to their second-closest state, one at at time, and test again. After testing each one of the bad-mod elements individually in this way, the receiver can then alter the bad-mod elements two-at-a-time, and may continue by altering multiple elements elements in combination, altering each one to the nearest and next-nearest states of the modulation scheme. The receiver can continue varying the bad-mod elements until all possible combinations of the bad-mod elements have been altered to their second-closest state of the modulation scheme, and can test each altered message against the EDC. Cycling between steps 205 and 206 repeatedly, until all combinations have been tested, is a loop, as indicated by a double-ended arrow connecting the two repeated steps. The double-ended arrow indicates that the two steps 205 and 206 are to be performed repeatedly until all the associated variations have all been tested, but aborting the loop if any of the variations passes the EDC test.

If the message fails the error-detection code test for all of the alterations of the bad-mod elements to their closest and second-closest states, the flow proceeds to 207 for a more exhaustive search. Here each of the bad-mod message elements is again altered sequentially, but now they are varied to all of the states of the modulation scheme, instead of being restricted to just the closest and the second-closest states. Each of the bad-mod message elements can be tested sequentially at each of the states, while all of the other bad-mod message elements are also altered in turn. Such a grid search, in which two or more items are independently varied and all possible combinations are tested, is a "nested" search. For example, if there are B bad-mod message elements and the modulation scheme has S states, the number of combinations is $S^B$ separate tests. If any of those tests results in agreement with the error-detection code at 208, the task is done at 210. If none of the tests is in agreement, at 209 a retransmission is requested. The current message may then be abandoned, or it may be retained for comparison with the retransmitted version.

The disclosed systems and methods further include assigning multiple categories of modulation quality, such as good, marginal, and bad-modulation quality, to message elements according to how far the element's modulation differs from the closest state of the modulation scheme, as described in the following examples.

Figure 3A:
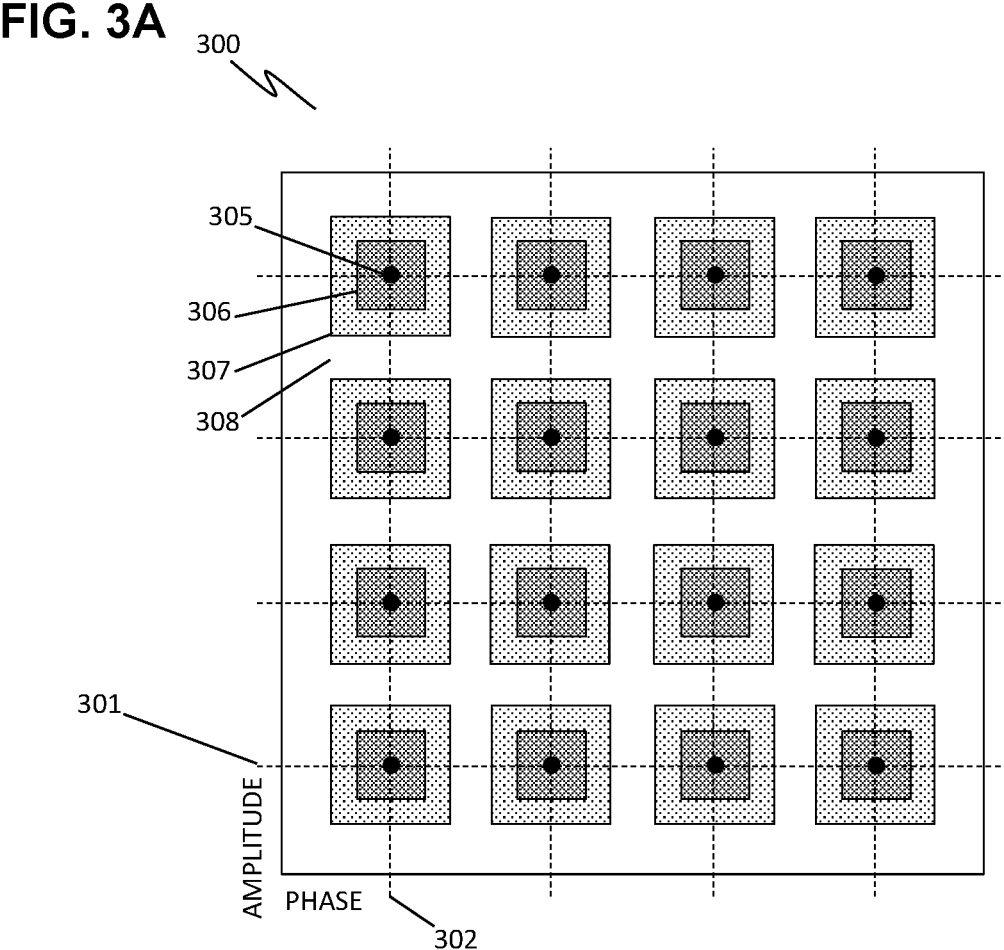
FIG. 3A is a schematic sketch showing an exemplary embodiment of a modulation table with multiple levels of modulation quality, according to some embodiments.

FIG. 3A is a schematic sketch showing an exemplary embodiment of a modulation table with multiple levels of modulation quality, according to some embodiments. As depicted in this non-limiting example, a modulation table 300 (for 16QAM in this case) includes four amplitude levels 301, four phase levels 302, and sixteen states 305. Around each state 305 is a good-modulation zone 306 in dark stipple, surrounded by a marginal (that is, marginal quality) modulation zone 307 in light stipple, and the remaining white space 308 is a bad-modulation zone. A message element with amplitude and phase modulation that falls in one of the good-modulation zones 306 may be assigned to the associated state 305 of the modulation scheme. A message element with modulation in the marginal-modulation zone 307 may also be assigned to the associated state 305, but with a flag indicating that it is suspicious due to its lower quality of fit to the levels of the modulation scheme. A message element with modulation in the bad-modulation zone 308 may be assigned to the nearest state 305, but with a flag indicating that it is very suspicious. If the message is faulted, the bad-modulation elements may be altered first, to see whether any alterations may satisfy the EDC test, and if none of those variations succeeds in agreeing with the error-detection code, then the bad-modulation elements and the marginal-modulation elements may be varied together.

Figure 3B:
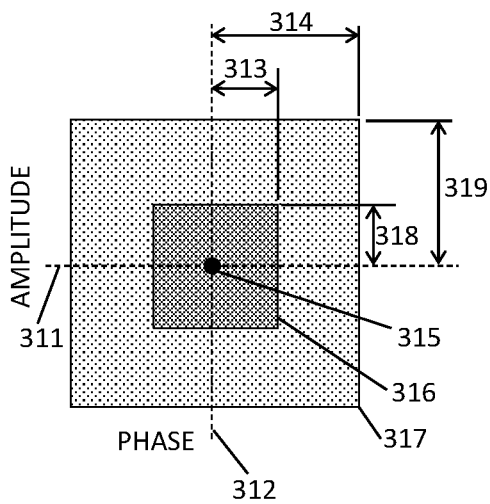
FIG. 3B is a schematic sketch showing an exemplary embodiment of a single modulation state with multiple levels of modulation quality, according to some embodiments.

FIG. 3B is a schematic sketch showing an exemplary embodiment of a single state with multiple levels of modulation quality, according to some embodiments. As depicted in this non-limiting example, a state 315 of a modulation scheme (such as one of the states of the previous figure) may be configured with amplitude level 311 and a phase level 312. The state 315 is surrounded by a good-modulation zone 316, and further surrounded by a marginal-modulation zone 317. The good-modulation zone 316 is a rectangular region enclosed by the amplitude level 311 plus or minus the amplitude range 318, and by the phase level 312 plus or minus the phase range 313. The marginal-modulation zone 317 may be a larger rectangular region defined by the amplitude level 311 plus or minus the larger amplitude range 319, and the phase level 312 plus or minus the larger phase range 314, exclusive of the good-modulation zone 316. Message elements modulated in the good-modulation zone 316 may be assigned the state 315 for demodulation, with high probability. Message elements modulated in the marginal-modulation zone 317 may also be assigned the state 315, but flagged as suspicious. Message elements modulated exterior to the marginal-modulation zone 317 may also be assigned the state 315 if that is the closest one, but may be flagged as bad-modulation. In some embodiments, the bad-modulation and marginal-modulation message elements are classed as "suspicious", for purposes of fault mitigation.

Figure 3C:
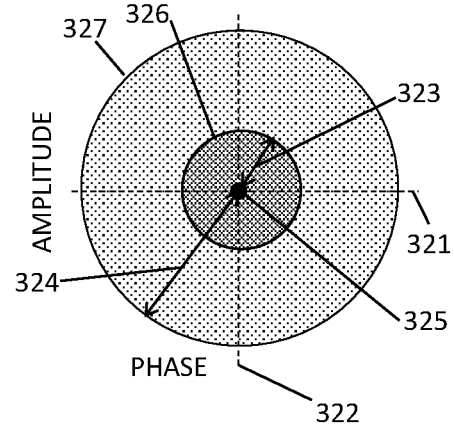
FIG. 3C is a schematic sketch showing another exemplary embodiment of a single modulation state with multiple levels of modulation quality, according to some embodiments.

FIG. 3C is a schematic sketch showing another exemplary embodiment of a single state with multiple levels of modulation quality, according to some embodiments. As depicted in this non-limiting example, a single state 325 modulated according to an amplitude level 321 and a phase level 322 is surrounded by a round region of good-modulation 326 which is surrounded by an annular region of marginal quality modulation 327. The radius 323 of the good-modulation region 326 is shown, and the outer radius 324 of the marginal-modulation region 327 is shown. Thus a message element may be allocated to the good-modulation category if the amplitude and phase modulation of the element are such that the modulation is in the good-modulation zone 326, and likewise for the marginal-modulation zone 327. For example, the "distance" of the message element from the state 325 may be calculated as the square root of the amplitude deviation squared plus the phase deviation squared. If this distance is less than the good-modulation radius 323, the message element may be allocated good-modulation quality. If the distance is greater than the good-modulation radius 323 but less than the marginal-modulation radius 324, the message element may be allocated marginal-modulation quality. If the distance is greater than the marginal-modulation radius 324, the message element may be allocated bad-modulation quality. (As mentioned, the amplitude distance may be normalized by the amplitude step, and the phase distance may be normalized by the phase step.)

Figure 4:
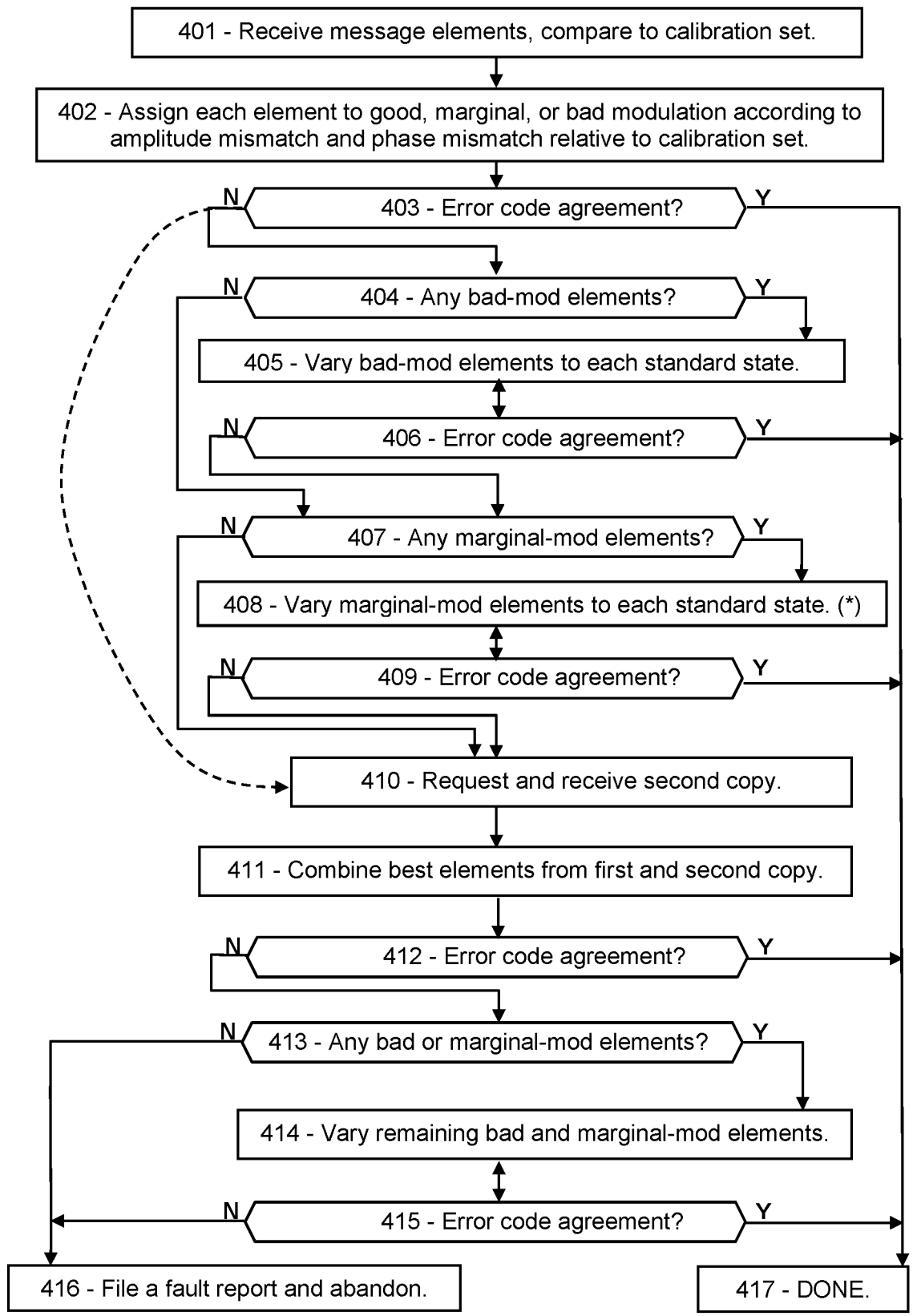
FIG. 4 is a flowchart showing an exemplary embodiment of a process for detecting and correcting message errors using multiple levels of modulation quality, according to some embodiments.

FIG. 4 is a flowchart showing an exemplary embodiment of a process for detecting and correcting message errors using multiple levels of modulation quality, according to some embodiments. As depicted in this non-limiting example, at 401 a receiver receives a message and compares each message element to the amplitude and phase levels previously provided in a calibration set. The calibration set includes the amplitude and phase levels of the modulation scheme, as provided by a demodulation reference, for example. At 402, the receiver assigns each message element to the closest state of the modulation scheme, and also allocates a modulation quality as good, marginal, or bad depending on the distance, in amplitude and phase, of the message modulation to the nearest state. After attempting to demodulate the message elements, the receiver compares the message to an error-detection code at 403. If the message agrees with the error-detection code, the task is done at 417. If not, the receiver checks at 404 whether the message contains any bad-modulation elements, and drops to 407 if not. If the message has at least one bad-modulation element, at 405 the receiver varies the bad-modulation elements among all of the states of the modulation scheme in a nested grid search, as indicated by a double arrow. For example, the receiver may alter the first bad-modulation element successively to each state, while keeping the other bad-modulation elements assigned to their closest states, and may test each variation against the error-detection code. The receiver may perform a similar scan using the second bad-modulation element while keeping all the others at their closest state values, and may continue such a single-element variation until all of the bad-modulation elements have been explored individually. Then, if no match has been found, the receiver may vary two of the bad-modulation elements across all of the states of the modulation scheme, testing each combination of two states at a time, and then proceeding in a similar way through all pairs of bad-modulation elements. Then, if no match has been found, the receiver may vary the bad-modulation elements three-at-a-time, exhaustively covering the states, and testing the error-detection code on each one. The receiver may continue this nested search until all combinations of bad-modulation element and all states have been tested. If any one of those variations satisfies the error-detection code, the message is demodulated and the task is done at 417. If not, the flow proceeds to 407.

At 407, the receiver determines whether the message has any marginal-modulation elements, and if so, it varies the marginal-modulation elements and the bad-modulation elements together in a nested search at 408, as indicated by a double arrow. (The asterisk is explained later.) For example, the receiver can vary the bad and marginal-modulation quality elements in an exhaustive grid search covering all combinations of the states for each message element allocated as marginal or bad-modulation, and may test the error-detection code for each variation at 409. If any of those variations agrees with the error-detection code, the task is done. If not, or if there are no marginal-modulation elements, the receiver may request and receive a second copy of the message at 410, and may merge the first and second copies by selecting the best quality version for each element at 411, and may test that merged version against the error-detection code at 412.

Then, at 413, the receiver may determine whether the merged message includes any remaining bad or marginal-modulation elements. If the message has all good-modulation elements, yet still fails the EDC test, then the receiver may abandon the message at 416 and optionally file a fault report, or alternatively may request yet another retransmission. However, if the merged message has one or more bad or marginal-modulation elements at 414, the receiver may vary those in another nested search such as those described above, testing each variation at 415. If one of those variations agrees with the error-detection code, the task is done. If not, the receiver may abandon (or request retransmission) at 416.

In some embodiments, the retransmitted message message may have one or more "paradoxical" message elements. A paradoxical message element is modulated in the good-modulation zone of one state in the first message, and is modulated in the good-modulation zone of a different state in the retransmitted message. That is, the message element appears to be correctly modulated in both message versions, but in different states. This can happen if the noise and interference have caused the distorted phase and amplitude of one or both of the versions to arrive, by chance, in another good-modulation zone. In that case, the receiver can flag all paradoxical message elements as suspicious, and can test both versions alter their state assignments in the same way as the bad-modulation elements.

In some embodiments, the receiver may determine the modulation quality as a calculated value, instead of the good-marginal-bad categories. The receiver can then vary the remaining suspicious elements according to the modulation quality value, starting with the message element that has the lowest modulation quality. The receiver can then proceed to vary and test the second-lowest modulation quality message element, and so forth until the error-detection code matches.

In some embodiments, the amount of time required to perform the searches of 406 to 409 may exceed the amount of time to request and receive a second copy of the message, in which case the receiver may request the second copy as soon as the initial version fails the error-detection code, as indicated by a dashed arrow. The receiver may already know how much time will be required to test the various combinations, on average, given the number of bad and marginal-modulation elements. The receiver may use an algorithm, for example, to calculate the time required. After requesting the retransmission, the receiver may continue to test variations while waiting for the retransmission to be received, in case one of the variations succeeds.

In some embodiments, the variations of the marginal-modulation message elements at 408 may be done in two stages for improved efficiency, as indicated by an asterisk (*). Some types of noise and interference cause only small changes in the phase and amplitude of message elements, and therefore each message element with marginal-modulation is, on average, more likely to belong to one of the adjacent states than to some more distant state that differs by a large amount in amplitude and phase from the correct modulation. As used herein, an "adjacent state" is a state of the modulation scheme differing from another state by one amplitude step or one phase step or both. Therefore, the receiver may alter each of the marginal-modulation message elements according to its eight adjacent states (or five adjacent states if already at the maximum or minimum amplitude). The receiver may test those nearest-neighbor variations first, because for some types of noise and interference, the nearest neighbors may be the most likely candidates for repairing the message. The receiver may alter each of the other marginal-modulation message elements according to their adjacent states as well, in a nested grid search. If none of those near-neighbor alterations, individually or in combination, passes the EDC test, then the receiver may proceed to vary the suspicious message elements across the entire set of states of the modulation scheme (preferably skipping the alterations that have already been checked). By testing the most likely combinations of message alterations first, the receiver may avoid a large number of variations that are less likely to succeed, and may thereby resolve the fault and recover the correct message quickly, according to some embodiments.

The systems and methods disclosed herein further include directional sectors around each state. The following examples show how a faulted message may be recovered using that direction information, according to some embodiments.

Figure 5A:
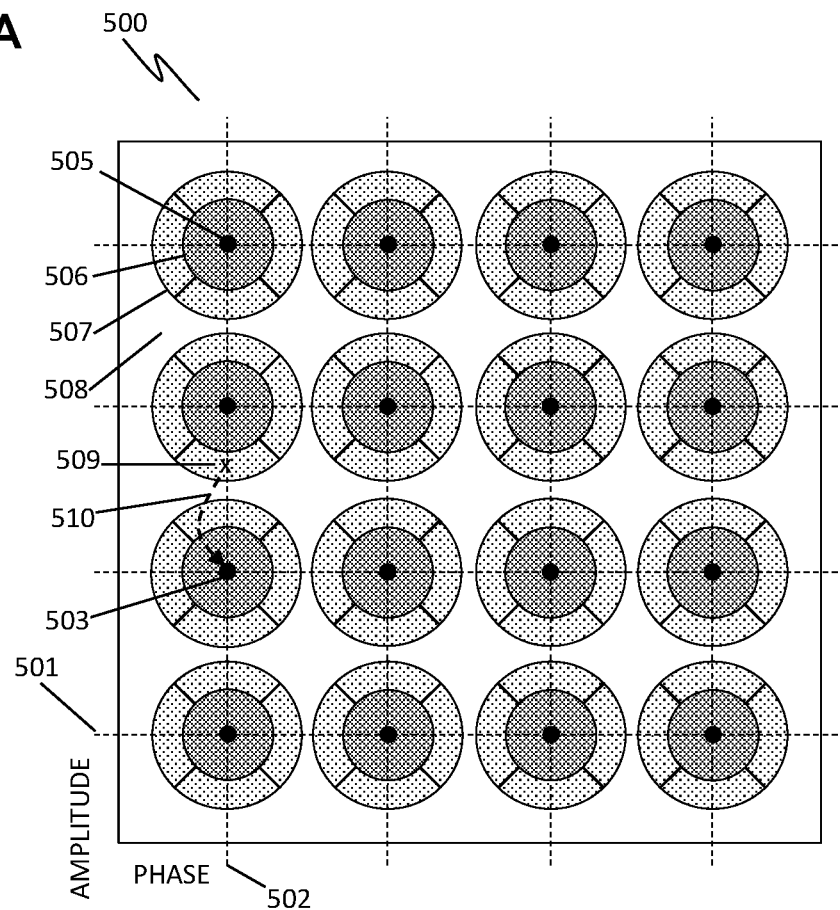
FIG. 5A is a schematic sketch showing an exemplary embodiment of a modulation table for 16QAM with directional deviation sectors, according to some embodiments.

FIG. 5A is a schematic sketch showing an exemplary embodiment of a modulation table for 16QAM with directional sectors, according to some embodiments. As depicted in this non-limiting example, a modulation table 500 with amplitude levels 501 and phase levels 502 define states 505 of the modulation scheme, each state 505 surrounded by a good quality modulation zone 506 and a marginal quality modulation zone 507, all surrounded by a white space bad quality modulation area 508.

The marginal quality modulation zones 507 are divided into multiple sectors. The sectors may assist the receiver in recovering a faulted message. For example, if a message fails the EDC test, the receiver may look for a particular message element modulated in a marginal quality zone 507, such as the "x" 509. The receiver may attempt to correct the message by altering the message element from the x 509 to the adjacent state according to the sector that the x 509 is in. In the depicted case, the x 509 is in a sector which is positioned or directed toward an adjacent state 503 with a lower amplitude level and the same phase. Therefore, as a first attempt, the receiver may alter the message element to the next-lower amplitude, as indicated by a dashed arrow 510 leading to the adjacent state 503, and may test that message alteration against the EDC code.

In another embodiment, the receiver may select a message element modulated in the bad quality zone 508, determine a direction according to the difference between the message element's modulation and the nearest state of the modulation scheme, and then alter the message element's assignment to the adjacent state in the direction indicated by its modulation.

Figure 5B:
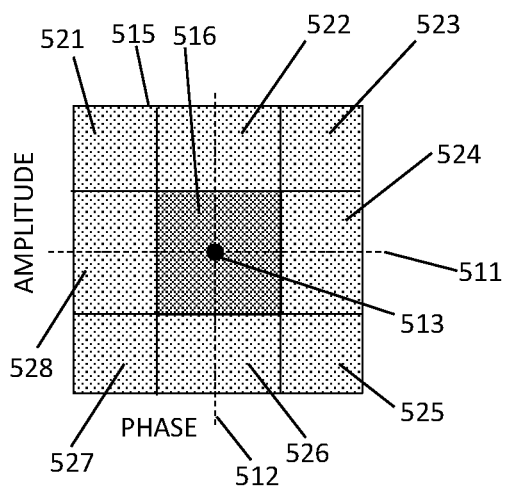
FIG. 5B is a schematic sketch showing an exemplary embodiment of a single modulation state with directional deviation sectors, according to some embodiments.

FIG. 5B is a schematic sketch showing an exemplary embodiment of a single state with directional deviation sectors, according to some embodiments. As depicted in this non-limiting example, a single predetermined state of the modulation scheme 513 is defined by an amplitude level 511 and a phase level 512 of the modulation scheme. The state 513 is surrounded by a good-modulation zone 516, which is surrounded by a marginal-modulation zone 515. The marginal-modulation zone 515 is divided into eight sectors in this case, 521, 522, 523, 524, 525, 526, 527, and 528. The sectors 521-528 may assist the receiver in determining how to modify and recover a faulted message. For example, if the message as-received fails the error-detection code, and one of the message elements is modulated according to, say, sector 524, then the receiver may alter that message element to the adjacent state in the direction indicated by the occupied sector, which in that case is the next-higher phase, and may test that variation.

In a similar way, if a message fails the error-check code and has a marginal-modulation element in sector 522, which is at the top-center of the marginal-modulation quality zone 515, then the receiver may alter that element to the next-higher amplitude state, and may then test that variation. For mitigating noise that causes only small displacements in amplitude or phase, the nearest neighbor in the direction of the as-received modulation may be the most likely candidate.

It may be noted that amplitude levels, unlike phase, do not always have an adjacent state in a specified direction. If the current state 513 is already at the highest amplitude level, then the receiver cannot increase it further, and therefore may ignore the sector information if it seems to point in the direction of even higher amplitude modulation. Likewise, if the message element occupies sector 527, the receiver may alter the message element to an adjacent state with one level lower amplitude and one level lower in phase. However, if the state is already at the lowest amplitude level, then the receiver cannot alter to the next-lower amplitude. As mentioned, phase does not have this limitation because phase is a circular parameter. For example, if the marginal-modulation element is in sector 528 and the element is already in the lowest phase level, then the receiver can alter the element to the highest phase level, since the lowest and highest phase levels are separated by just one phase step.

The receiver may use the sector information as a guide for varying the modulation state assignments, especially in cases where the distortion is small, since in that case the near neighbors are more likely than the others to be the correct value for the faulted message element. If those initial small variations fail to agree with the error-check code, then larger variations may be tested.

Figure 5C:
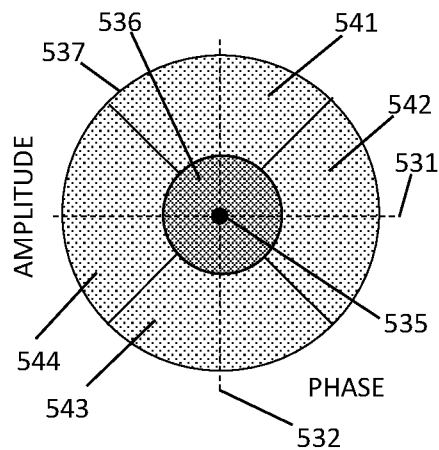
FIG. 5C is a schematic sketch showing another exemplary embodiment of a single modulation state with directional deviation sectors, according to some embodiments.

FIG. 5C is a schematic sketch showing another exemplary embodiment of a single state with directional deviation sectors, according to some embodiments. As depicted in this non-limiting example, a single predetermined modulation state of a modulation scheme is indicated as 535 at the intersection of an amplitude level 531 and a phase level 532, surrounded by a good-modulation zone 536 and a marginal-modulation zone 537 which is divided into four sectors 541, 542, 543, 544. As in the previous example, the receiver may receive a faulted message containing at least one marginal-modulation element, and may attempt a recovery by altering the marginal-modulation element to an adjacent state in the direction of the sector in which the message element is modulated. By making the most likely alterations first, the receiver may thereby find the correct message quickly, saving time and reducing the calculation burden.

In another embodiment, instead of assigning message elements in the marginal zone to sectors, the receiver may determine a distance value and a direction value according to the amplitude and phase modulation of each message element relative to the closest state. If the message fails to agree with the error-detection code, the receiver may select one or more message elements having the largest distance value, and may alter those message elements to the nearest neighbor according to the direction value.

Figure 6:
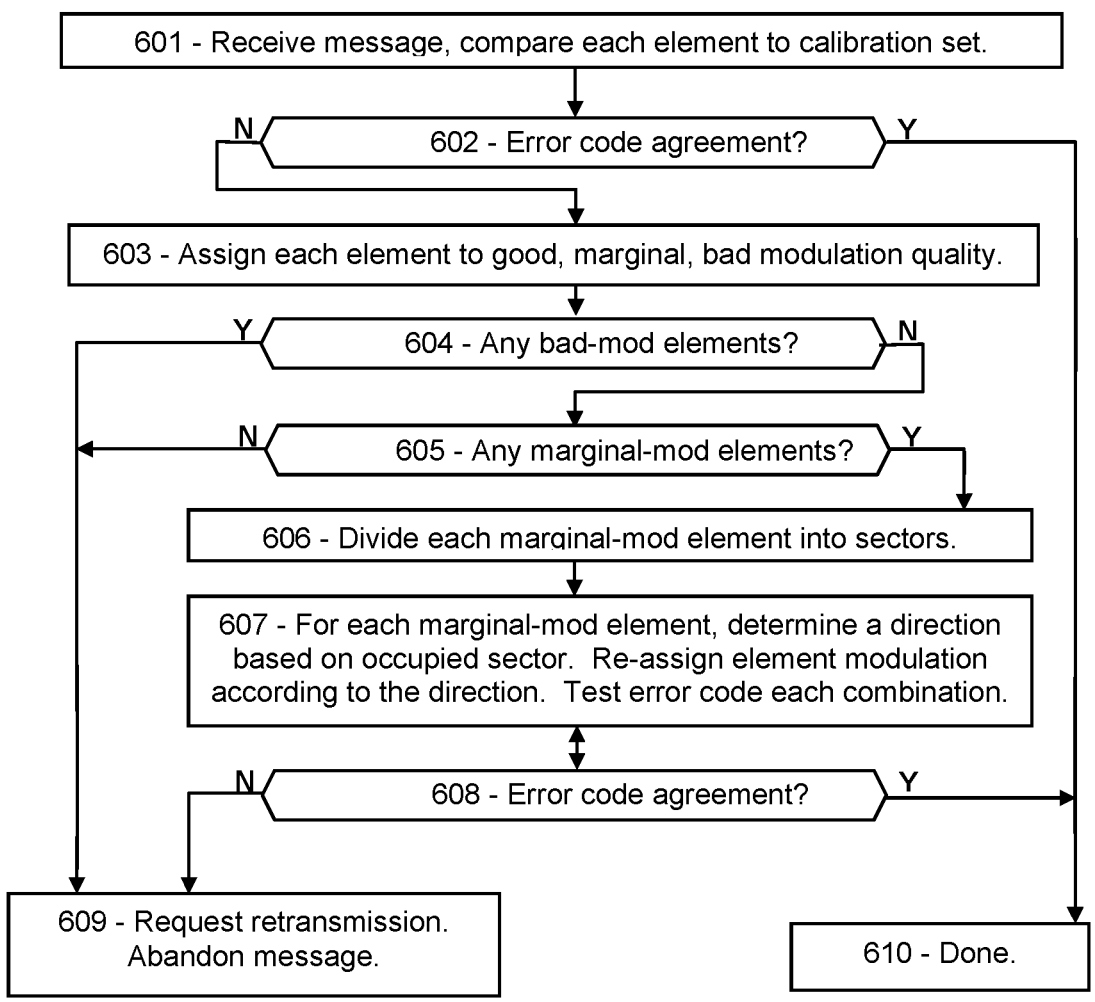
FIG. 6 is a flowchart showing an exemplary embodiment of a process for detecting and correcting message errors according to directional deviation sectors, according to some embodiments.

FIG. 6 is a flowchart showing an exemplary embodiment of a process for detecting and correcting message errors according to directional deviation sectors, according to some embodiments. As depicted in this non-limiting example, a receiver may receive a message at 601, demodulate each message element using a previously determined calibration set including the amplitude and phase levels of the modulation scheme, and then at 602 can compare the message to an embedded error-detection code. If the message agrees with the error-detection code, the task is done at 610. If not, at 603 the receiver may allocate each message element to good, marginal, or bad-modulation zones according to how close the modulation of the message element is to the closest state. At 604, the receiver determines whether any of the message elements falls in the bad-modulation zone, and if so, the receiver may abandon the message at 609 and request a retransmission, in this example. If there are no bad-modulation elements, the receiver may determine at 605 whether there are some marginal-modulation elements, in which case the receiver may attempt to recover the message using sector information. At 606, if not sooner, the receiver may divide each marginal-modulation zone into sectors according to amplitude and phase modulation around each state, and at 607 may determine a direction based on which sector is occupied by each message element with marginal quality modulation or bad quality modulation. The receiver may then alter each marginal or bad-modulation message element to the adjacent state in the direction indicated by the occupied sector, and may test that variation against the error-detection code. If the altered message passes the error-detection test at 608, the receiver has succeeded in recovering a faulted message and is done. If not, the receiver may request a retransmission, and may abandon the message or merge the message with the retransmitted copy, in some embodiments.

In another embodiment, upon receiving a corrupted message, the receiver can calculate a distance value and a direction value according to the modulation of each message element relative to the nearest state of the modulation scheme. To attempt to recover the corrupted message, the receiver can select the message element with the largest distance value, and can alter that message element's state assignment to an adjacent state according to the direction value, and test that altered version against the error-detection code. The receiver can then alter other message element assignments according to their distance values, starting with the largest distance values, and altering each of the message elements to adjacent states according to the direction value. The receiver can perform a nested search among the message elements with distance values exceeding a threshold, for example, testing each such combination. If not successful, the receiver can then alter the message element with the largest distance across all of the states of the modulation scheme, testing each. The receiver can then select further message elements according to distance and vary each according to their direction values or alternatively across the entire modulation scheme, testing each combination. Thus the receiver can select which message elements to alter, and in what order, based on their distance values instead of the good-marginal-bad categories, and the receiver can alter each message element according to the direction value instead of the deviation sectors. In addition, the receiver can calculate how long it will take to perform the alterations, given the number and size of the distance values of the message elements, and can determine whether the amount of time will likely exceed the time required for a retransmission, in which case the receiver may request the retransmission before or concurrently with performing the alterations and tests just described.

The systems and methods disclosed herein further include procedures for merging a message with a retransmitted copy of the same message. If either of the message versions agrees with the embedded error-detection code, then the task is done. However, if both of the message versions disagree with the error-detection code, then the two messages can be merged by selecting the corresponding message elements with the best modulation quality from each of the two versions. If both messages contain faults, it is likely that the faults will occur in different message elements in the two versions. It is also likely that the faulted message elements will exhibit lower quality modulation than the correct elements. Therefore, by eliminating the lower-quality modulation elements from the merged message, the merged message is likely to be fault-free. As mentioned, the selection of the better quality message element versions may be based on a good-marginal-bad categorization, or on the distance values of each message element, among other criteria and parameters, in various embodiments.

The examples provided above disclosed methods for evaluating message elements based on the modulation quality. But in real communications, many factors may affect the fault rate and the types of faults likely to occur, and many other types of information may be gleaned from the message elements. For example, the likelihood that a particular message element is at fault may be determined, in part, by the SNR of the signal received because interference or noise is likely to cause the received signal to exhibit variations that can be measured by the receiver. In addition, interference from transmissions in other cells is often time-shifted due to differences in cell time-bases, signal propagation time, etc. In that case, the effects of interference may show up in the modulated signal of each message element in various ways. Detection of such time dispersion may further indicate which message elements are faulted. In addition, if a message is transmitted with a phase-only modulation scheme such as QPSK, then a message symbol with an amplitude different from the other message elements may be suspicious. The receiver may therefore calculate an overall quality factor for each message element, the overall quality factor including some combination of the modulation distance from the nearest state, the SNR, amplitude anomalies, and other measures of message element quality, for example.

A demodulation reference, placed before the message, may largely mitigate the effects of noise and interference, depending on the proximity of each message element to the demodulation reference, the time-frequency variations of the noise and interference, and other factors. In addition, the receiving entity may already know information about the incoming message, such as the expected format and length, or partial content information, and may use that information to assess fault probabilities for each of the message elements. Due to these and other interacting variables, determining which messages are faulted is a complex problem, and determining their proper values is even more complex in practice. Therefore, the systems and methods include an artificial intelligence model, trained with massive machine learning, for determining which message elements are likely faulted in a corrupt message. In some cases, the AI model may also provide guidance for finding the correct value of the faulted message elements. The systems and methods further include an algorithm derived from the AI model, configured for base stations and/or user devices to diagnose corrupt messages while minimizing costly retransmissions and message abandonments. Further details are provided in the following examples.

Figure 7A:
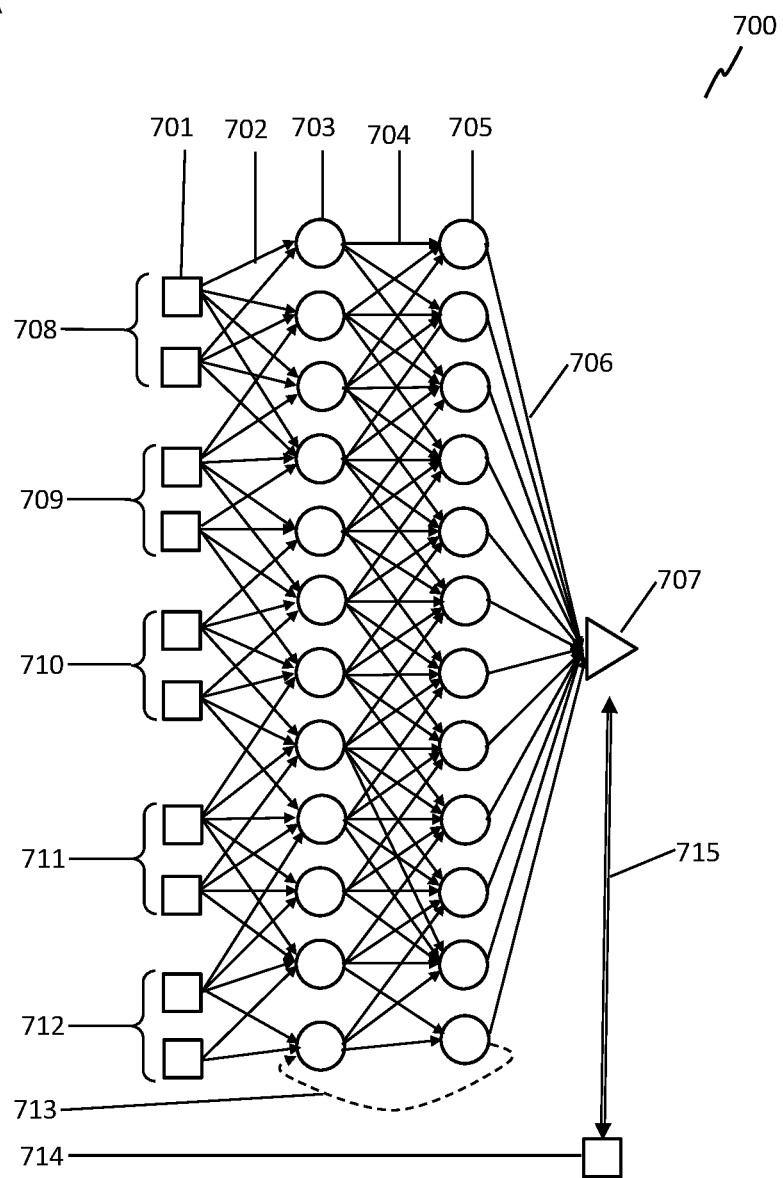
FIG. 7A is a schematic showing an exemplary embodiment of an AI structure for detecting and correcting message errors, according to some embodiments.

FIG. 7A is a schematic showing an exemplary embodiment of an AI structure for detecting and optionally correcting message errors, according to some embodiments. As depicted in this non-limiting example, an AI structure 700, such as a neural net or other computer software arrangement, may include inputs and outputs connected to internal functions, including variables that are trained to detect (and in some cases correct) message faults, according to some embodiments.

As depicted in this non-limiting example, an AI structure 700 may be configured as a neural net, or as another type of artificial intelligence or machine learning program structure that provides error detection based on input factors. The depicted AI structure 700 includes an input layer 701 of input parameters represented as boxes, one or more output 707 value(s) represented as a triangle, and two layers of internal functions 703 and 705 represented as circles. (The various items are sometimes called "nodes", not to be confused with the nodes of a wireless network.) Weighted directional links 702 indicate the flow of input data from the inputs 701 to the first internal layer 703, and additional weighted directional links 704 indicate the flow of processed data from the first internal layer 703 to the second internal layer 705, and further weighted directional links 706 indicate the flow of processed data from the second internal layer 705 to the output 707.

When provided with specific input parameters, and "trained" or adjusted to solve a particular problem, the AI structure 700 becomes an "AI model" which, in this case, is configured to determines which message elements in a corrupted message are likely at fault, based on the input parameters, so that the receiver can attempt a mitigation by varying the likely faulted message elements or requesting a retransmission, for example. In some embodiments, the outputs 707 may include indications of the most likely correct values for certain message elements, when feasible. The inputs 701 may include the modulation quality (such as the modulation category, or the distance from the closest state of the modulation scheme, or the direction of each message element's modulation based on the amplitude and phase deviations, as mentioned), as well as the SNR or other measure of the signal of each message element, and external or environmental measurements related to the noise and interference background 708, the proximity to one or more demodulation references 709, signal properties of the message 710, any retransmissions 711 including whether each message element is the same or different in the original and retransmitted versions, and (if known) the expected size and format 712 of the message. In addition, a final input 714 is shown separate from the others. This input 714 includes a list of the actual faulted message elements, as determined by comparing the received message to the finally corrected version. The corrected version is based on agreement with the error-detection code, as mentioned. However, the list of faulted message elements 714 is not provided to the structure; it is used as a training value. After the model provides outputs 707 indicating which message elements are likely faulted, and optionally their correct values, that prediction is compared 715 with the "ground truth" data 714, the list of the actual message element faults.

The AI structure 700 includes directional links 702, 704, 706 which may also include mathematical and/or logical operations, such as multiplying the output from each node of a previous layer by a predetermined coefficient, and then passing the product to one or all of the nodes of the next layer, among other possible computations. In some embodiments, on the other hand, the links 702, 704, 706 may perform no computation, in which case all functionality is contained in the internal functions 703 and 705. Although links are shown in the figure connecting each node to just a portion of the next layer for clarity, in some embodiments every node of each layer is linked to every node of the next layer. Additional layers, and many additional input and output parameters, may be added as needed to model the faulted message elements in a practical network scenario.

The internal functions 703 and 705 may include any mathematical or logical functions of the links leading to it. In various embodiments, each internal function 703 or 705 may include arithmetic or mathematical formulas, nonlinear functions (such as exponential or arctangent compression functions), Boolean logic (such as, "take link A if link B is larger than link C, and take link D otherwise"), among many other functional options of the data on each link leading to each internal function. Each internal function 703 and 705 may include one or more variables or adjustable parameters, which are then adjusted iteratively according to the network data to successively improve the model's predictions. In some embodiments, the internal functions 703 and 705 may perform the same operations on all of their inputs, such as averaging, whereas in other embodiments the internal functions process each data flow from each connected link differently. In some embodiments, the structure 700 may include feedback 713 to a previous layer, or bidirectional links, or other complex topology, although convergence is then generally not guaranteed.

The output 707 is, in this case, a prediction of which message elements are likely faulted. The results may assist a receiver in determining how to process a faulted message. For example, if the number of faulted message elements is less than a predetermined maximum number of faults (such as just one or two remaining faulted message elements), then the receiver may vary the message elements that the AI model has indicated are suspicious. The AI model may indicate a level of suspiciousness or an overall quality factor for each message element. For example, the receiver can alter the most suspicious or lowest quality message elements in a nested grid search, with some expectation of success. In addition, the AI model may indicate that there are more faults than the predetermined maximum, in which case the receiver can request a retransmission instead of embarking on a time-consuming and probably futile search.

In some embodiments, the output 707 may also indicate the most probable corrected value for each of the faulted message elements. This prediction may be based on the modulation direction relative to the nearest state, for example. The direction may lead to an adjacent state of the modulation scheme. The output 707 may thereby indicate how the receiver can alter the state assignment of each suspicious message element to efficiently search for the correct version. For example, the receiver can initially vary the message element indicated by the AI model in the suggested direction to the adjacent state, or in another direction as indicated by the AI model based on the inputs. If that alteration fails to agree with the error-detection code, the receiver can then alter the message element among the other near-neighbor states, or to all of the states of the modulation scheme until the altered message agrees with the error-detection code.

The internal function variables and weighting factors and other adjustable variables may be adjusted to "tune" or "train" the model based on prior received message data. The AI model may initially start with the adjustable variables set arbitrarily, or set by logic or intuition, or otherwise. Then, data from actual messages and network activity may be used as the inputs 701 and the AI model may calculate (or predict) which message elements are faulted, if any. The AI model can also provide a rating as to the likelihood that each message element is faulted. The AI model can also suggest an alteration of the faulted message elements, in some cases. The prediction 707 is then compared 715 to the number and position of actual faults 714, as determined when the message has been corrected and finally agrees with the error-detection code. In training the AI model, each variable (or a group of variables) may be adjusted in some manner, such as increased or decreased, and the prediction may be again calculated and compared with the actual fault locations. If the prediction is improved by that variation, the variables may be adjusted further in the same manner; but if the prediction is worse, the variables may be adjusted in the opposite way or in some other manner. In each adjustment or series of adjustments of the variables, the most influential variables may be determined empirically, either by varying each variable individually, or by tracing backwards from the output 707 through each link and function to determine which variables affect the output most strongly. Then, subsequent variations may focus primarily on the most influential variables. This iterative training process, of repeated adjustment of variables and comparison of the prediction, may be repeated for a large number of different message types with different noise and interference, and other input parameters, until a particular set of variable values may be found that provides satisfactory predictions of fault locations in messages across a wide variety of situations and interference levels.

After tuning the AI model and obtaining satisfactory fault predictions, an algorithm may be prepared for user devices and base stations to use for fault mitigation in the field. In some embodiments, the algorithm may be the AI model itself, but with the variables frozen at the most advantageous settings. In addition, the algorithm may be simplified by removing ("pruning") the least-productive inputs, links, and internal functions. In other embodiments, the algorithm may be distinct from the AI model but based on it. For example, the algorithm may be a computer program or subroutine, an interpolatable tabulation of values, or a graphical device, among many other calculation means for specifying fault locations in messages according to the input parameters. In some embodiments, two algorithm versions may be developed, such as a complex and versatile version for base stations to use with their high-performance processing power, and a simpler, specialized, or low-complexity version for user devices to use with their more limited processing capability, for example.

Figure 7B:
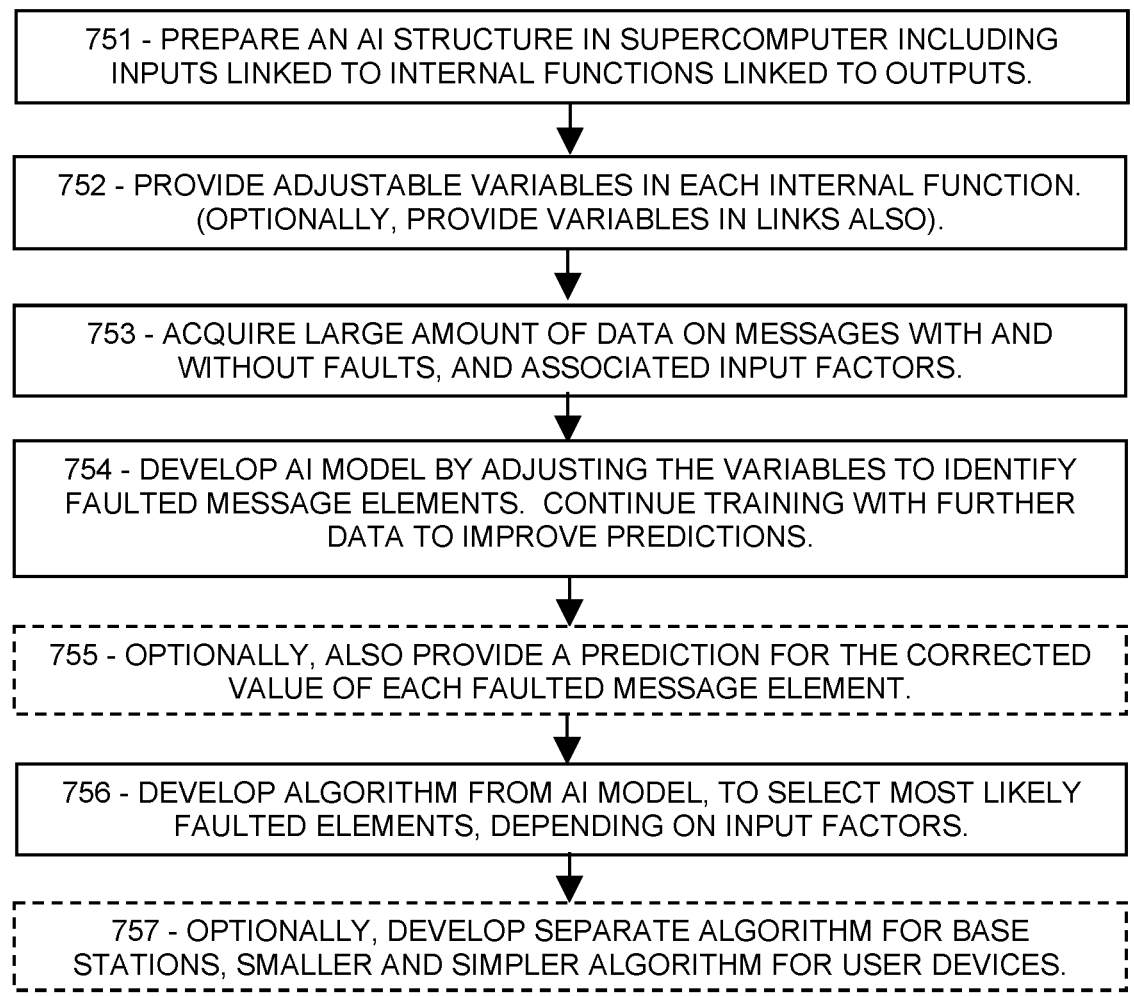
FIG. 7B is a flowchart showing an exemplary embodiment of a process for using artificial intelligence to detect and correct message errors, according to some embodiments.

FIG. 7B is a flowchart showing an exemplary embodiment of a process for using artificial intelligence to detect and correct message errors, according to some embodiments. As depicted in this non-limiting example, at 751, an AI structure is prepared in a computer, with input values linked to internal functions linked to an output. The AI structure may be custom-designed for this application, or may be adapted from a standard AI platform such as a neural net, among many other types of AI structures. At 752, adjustable variables are provided in the internal functions and, if applicable, the links. At 753, data may be acquired (preferably a large amount of data) on messages, received with and without faults, under various network and background conditions. At 754, an AI model is prepared by adapting the AI structure to the fault-prediction problem, by adjusting the internal variables until the outputs correctly indicate which message elements are faulted most of the time, or other measure of sufficient performance. The training process may be performed iteratively by adjusting the variables based on individual messages with faults, or by focusing initially on single-fault messages before expanding into multi-fault messages, or by combining ("clustering") multiple message scenarios that share similar features, or other training procedures aimed at finding a set of variable values that identify faulted message elements with sufficient accuracy. Optionally, at 755, the AI model may also provide suggestions as to the likely correct values of the faulted message elements. For example, the model may suggest that an adjacent state of the modulation scheme may be most likely, based on the amplitude and phase of the faulted message element, the types of noise and interference detected, the expected features of the message, and other factors. At 756, after obtaining a satisfactory level of success at finding the faulted message elements, a portable algorithm may be developed from the tuned AI model. The portable algorithm may enable base stations or user devices to analyze and mitigate corrupted messages. As mentioned, two versions of the algorithm may be developed at 757, according to the different capabilities of base stations and user devices, for example.

Due to the potentially large number of inputs and adjustable variables in the model, and the very large amount of training data likely needed for convergence of the model, the AI structure is preferably prepared in a supercomputer. The supercomputer may be a classical semiconductor-based computer, with sufficient speed and thread count and processor count to perform the model training in a feasible amount of time. Alternatively, the supercomputer may be a quantum computer having "qbits" or quantum bits as its working elements. Quantum computers may provide special advantages to solving AI models because they can very rapidly explore a complex terrain of values, such as the highly interrelated effects of the various inputs on the output results. Therefore, the systems and methods include a quantum computer programmed to include an AI structure and trained on wireless message data to recognize faulted messages, determine which message elements are faulted, and if possible to recommend the most likely values of each faulted message element. By narrowing the number of choices that need to be compared to an error-check value, the AI model may thereby make message error detection and correction feasible, without the need for a retransmission, thereby recovering the correct message contents while saving time and resources.

Figure 8A:
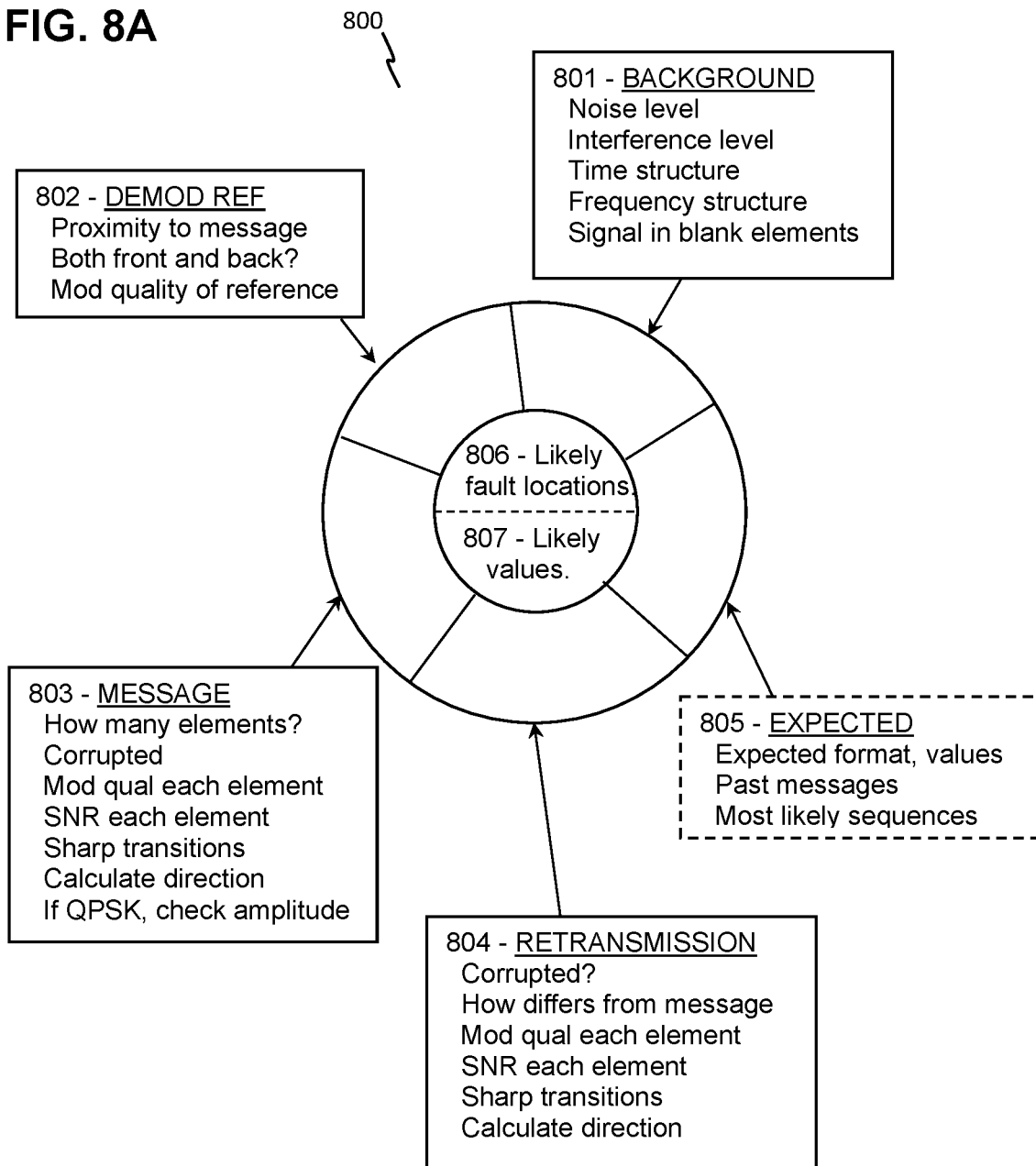
FIG. 8A is a schematic showing an exemplary embodiment of input parameters related to detecting and correcting message faults, according to some embodiments.

FIG. 8A is a schematic showing an exemplary embodiment of input parameters related to detecting and correcting message faults, according to some embodiments. As depicted in this non-limiting example, the input parameters 800 of an AI model, configured for determining which message elements 806 of a received message are likely faulted, and optionally their most probable values 807, may include background parameters 801, demodulation reference parameters 802, message signal parameters 803, properties of a retransmitted copy (if any) 804, and optionally the parameters that the receiver may expect or anticipate in the message 805, among other inputs.

The background parameters 801 may include a noise level, which in this context is generally related to random electronic noise in the transmitter or receiver, and may be well-characterized in advance. An interference level, often due to message transmissions from neighboring cells, may be determined by measuring narrow-band bursty signals other than received messages. In addition, signals resembling noise or interference can be generated by equipment such as switchgear, with usually a complex frequency spectrum and intermittent pulsation. The input parameters may include the measured time structure and/or frequency spectrum of the observed noise plus interference, which may affect how the algorithm separates faulted message elements from unfaulted ones. In addition, the receiver can evaluate the background by measuring the received energy during a blank resource element, not containing uplink or downlink transmissions from within the receiver's cell. For example, the receiver can detect a blank resource element as having signals with an amplitude substantially lower than the lowest amplitude modulation level of the modulation scheme. Any activity detected in a blank resource element may be ascribed to noise or interference.

The demodulation reference parameters 802 may include parameters of the demodulation reference (its size and type for example), how close the demodulation reference is to the message (in time and frequency), and whether there are two (or more) demodulation references placed before and after the message. The presence of at least one demodulation reference proximate to the message may be important because noise or interference may distort the reference elements of the demodulation reference in the same way, or a similar way, as the message elements. When the amplitude and phase levels of the demodulation reference are then used to demodulate the message elements, those distortions may cancel, thereby mitigating the noise or interference. Another parameter may be the modulation quality of the reference elements, determined for example by comparing a received demodulation reference to prior versions. A sufficiently distorted demodulation reference may cause all of the message elements to appear to be faulted, when in fact the message is correct and it is the demodulation reference that is faulted.

The message parameters 803 may include the size and modulation of the message, the modulation quality and SNR of each element, and various signal properties. For example, the signal properties may include the modulation quality of each message element, based on the difference between the amplitude or phase modulation of each message element, and the closest state of the modulation scheme. The receiver or the algorithm can also calculate a direction, in phase-amplitude space, corresponding to the message element's modulation relative to the closest state.

The signal properties may include a SNR measurement for each message element, since some types of noise or interference can cause variations in the amplitude of the received signal, which may appear as a reduced SNR for that message element. For example, interference from a moving vehicle can result in a variety of distortions such as a frequency shift (Doppler shift) that, when added to the stationary transmitter's signal, exhibits an oscillation pattern caused by two wave signals of slightly different wavelength. The signal may be received as a fluctuating waveform or a decrease in the SNR of the message element.

The receiver can also measure the "transitions" between sequential modulated resource elements. A transition, in this context, is the brief interval during which the amplitude or phase of the signal changes from one modulation state to the next. The receiver may determine whether the transitions are as sharp as expected. If interference is present due to signals from a distant cell, for example, the transitions may be smeared or widened due to the propagation delay or separate time-base of the second signal.

When the modulation scheme has just a single amplitude level, such as QPSK, the receiver can measure the amplitudes of the received message elements and detect interference if one of the amplitudes is substantially larger or smaller in amplitude than the others. A message element with amplitude significantly different from the others may be suspicious.

If a retransmission of the same message has been received, the input parameters may further include the parameters of the retransmitted message 804, which may include the same parameters as mentioned for the originally received message, and/or additional parameters such as inconsistencies between the two copies. Comparison between the two copies may further expose faulted message elements. If a message element in one of the copies has substantially greater modulation quality or SNR than the corresponding element of the other copy, then the one with lower quality is likely faulted.

The input parameters may further include parameters that the receiver may be expecting 805 based on foreknowledge. The receiver may be expected a particular type or format or content, for example. The receiver may base the expectation on a requested response, or on past messages received, or other criteria. For example, a user device such as a timer may receive certain standard messages repeatedly, such as "start", "stop", and "report". If a received message resembles one of those types but has one message element deviating from the expected format, such as "repoXt" instead of "report", then the deviating message element may be faulted. Comparison of received messages with prior similar messages, or with a set of predetermined formats, may thereby indicate faulted message elements.

The AI model, or an algorithm derived from it, may take the above listed parameters, and other parameters, as input, and indicate which message elements of a message are likely faulted, and optionally may suggest possible corrected values for those faulted message elements.

Figure 8B:
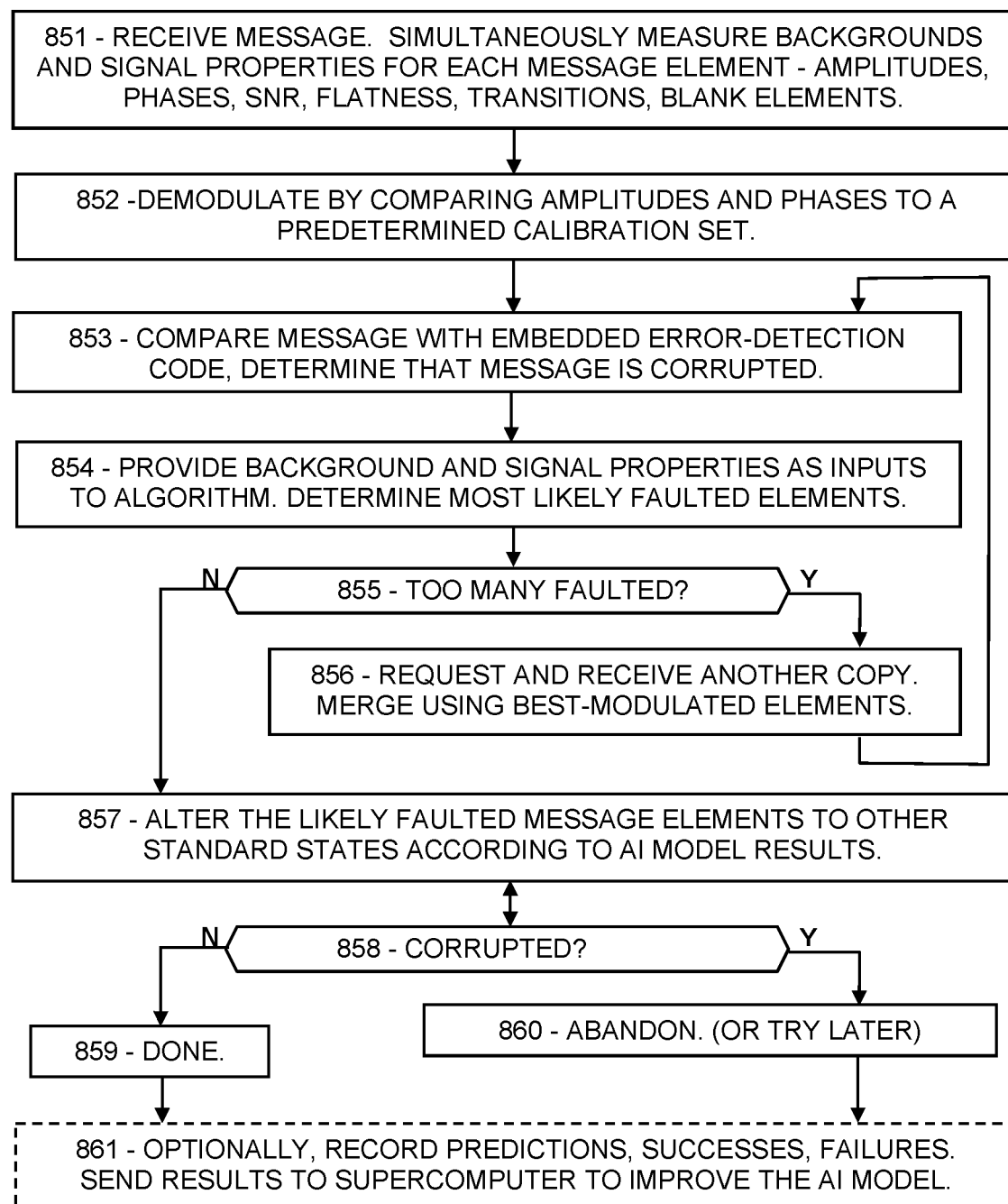
FIG. 8B is a flowchart showing an exemplary embodiment of a procedure for a receiver to use an AI algorithm, according to some embodiments.

FIG. 8B is a flowchart showing an exemplary embodiment of a procedure for a receiver to use an AI algorithm, according to some embodiments. As depicted in this non-limiting example, at 851 the receiver receives a message, and may measure signal parameters while receiving the message, such as the modulation quality or SNR or amplitude flatness or transition sharpness for example. The receiver may also determine a background noise and interference level by measuring stray signals during blank resource elements proximate to the message. Blank resource elements, with no locally transmitted signal, may permit a direct measure of current noise and interference.

At 852, the receiver demodulates the message by comparing the amplitude and phase of each message element to the amplitude and phase levels of a calibration set, previously derived from one or more demodulation references which may be provided before and, preferably, after the message. If two demodulation references are provided fore and aft of the message, a weighted average (such as an interpolation) of the two demodulation references may be used to demodulate each message element, the weighting based on the position of each message element relative to the two demodulation references.

At 853, the receiver may compare the demodulated message with an embedded error-detection code and thereby determine whether the message is corrupted. In this case, it is corrupted. Therefore, at 854, the receiver provides the measured data regarding backgrounds and signal properties and so forth, to an algorithm. The algorithm is derived from an AI model, and configured to determine which of the message elements is/are likely faulted, or a quality rating for each message element, or a likelihood that the message element is faulted, for example.

At 855, the receiver determines whether the number of likely faulted message elements is greater or less than a predetermined maximum. If the number of likely faults is greater than the maximum, then the receiver may conclude that varying the faulted elements is futile and may request a retransmission at 856. The receiver may then merge the two copies by taking the best message elements from each copy (such as the higher quality modulation or the higher SNR or a combination of these). Then, using the merged version, the receiver may return to 853 to test the merged version.

If, however, the number of faults is less than the maximum at 855, then the receiver may attempt a grid search by altering the state assignment of each of the likely faulted message elements at 857 and testing the altered message against the error-detection code at 858, continuing through all combinations of the likely faulted message elements, as indicated by a double-ended arrow. For example, the receiver may alter each likely faulted message element by re-assigning to an adjacent state of the modulation scheme in a direction indicated by the algorithm, based on the message element's modulation, and then test that version. If not successful, the receiver may alter the message element among all of the other adjacent states, testing each. If still unsuccessful, the receiver may vary the message element to each of the remaining states to see if any of those agrees with the error-detection code. The receiver may vary each of the likely faulted message elements individually in this manner, or in combination with other likely faulted message elements in a nested grid search, exhaustively covering all possible combinations of assignments for each of the likely faulted message elements, if necessary. If any of those alterations agrees with the error-detection code, the task is done at 859. If none of the versions is successful, the receiver may abandon the message at 860, or request a retransmission. If backgrounds are high, the receiver may wait until a later time and request a retransmission at that time. For example, the receiver may monitor the interference level and request the retransmission after the interference has subsided, thereby obtaining a message copy with fewer faulted message elements.

As an option, at 861, the receiver may record message data, including faults, and optionally including the algorithm predictions of which message elements are likely faulted. The receiver, or other network item, may then transmit that data to the AI model for further refinement of the model.

5G and 6G have enormous potential for communications between user devices base stations, vehicles in traffic, roadside devices, and innumerable other applications for low-cost wireless communication. The systems and methods disclosed herein are intended to provide means for base stations and user devices to detect and correct faulted messages using AI-derived algorithms, and thereby to reduce message failures, interference with other cells, and time lost to retransmissions, thereby improving network operation and customer satisfaction overall.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file—storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A computer containing software comprising an artificial intelligence (AI) model, the computer configured to:
   a) take as input a plurality of input data comprising:
      i) a received wireless message, the message comprising message elements, each message element modulated according to a modulation scheme, the modulation scheme comprising a plurality of predetermined amplitude modulation levels or a plurality of predetermined phase modulation levels or both; and
      ii) a modulation quality of each message element, the modulation quality based on an amplitude difference between an amplitude of the message element and one of the predetermined amplitude modulation levels of the modulation scheme, or a phase difference between a phase of the message element and one of the predetermined phase modulation levels of the modulation scheme, or both; and
   b) determine, as output:
      i) for each message element of the message, a likelihood that the message element is faulted; and
      ii) a most probable number of faulted message elements in the message.

2. The computer of claim 1, wherein the wireless message is configured according to 5G or 6G technology.

3. The computer of claim 1, further configured to:
   a) receive or determine a threshold number; and
   b) determine whether the most probable number of faulted message elements exceeds the threshold number.

4. The computer of claim 3, further configured to:
   a) provide, as further output, a recommendation, wherein:
      i) if the number of faulted message elements is less than the threshold number, the recommendation recommends to attempt to obtain an unfaulted message by altering the message elements that have the highest likelihood of being faulted; and
      ii) if the number of faulted message elements is equal to or greater than the threshold number, the recommendation recommends to request a retransmission of the message.

5. The computer of claim 1, wherein:
a) the likelihood that each message element is faulted is further based, at least in part, on a signal-to-noise ratio of the message element.

6. The computer of claim 1, wherein:
a) the likelihood that each message element is faulted is further based, at least in part, on a distance, in time or in frequency, between the message element and a nearest demodulation reference.

7. The computer of claim 6, wherein:
a) the likelihood that each message element is faulted is further based, at least in part, on a modulation quality of the nearest demodulation reference.

8. The computer of claim 1, wherein:
a) the likelihood that each message element is faulted is further based, at least in part, on whether an amplitude of the message element varies during the message element.

9. The computer of claim 1, wherein:
a) the likelihood that each message element is faulted is further based, at least in part, on a property of a transition between a signal of the message element and a second signal of a temporally adjacent message element.

10. The computer of claim 1, wherein:
a) the likelihood that each message element is faulted is further based, at least in part, on a comparison between the message and a plurality of previously received messages.

11. The computer of claim 1, wherein:
a) the likelihood that each message element is faulted is further based, at least in part, on an expected message format of the message.

12. The computer of claim 1, wherein:
a) the likelihood that each message element is faulted is further based, at least in part, on a measured amount of electromagnetic background during the message element.

13. The computer of claim 1, further configured to:
a) take, as further input, a corrected version of the message; and
b) determine, according to the corrected version, an accuracy of the determination of the likelihood that each message element is faulted.

14. The computer of claim 13, further configured to:
a) adjust at least one internal variable of the AI model according to the accuracy so determined.

15. Non-transitory computer-readable media in a computer, the media containing an artificial intelligence model and instructions that, when implemented in a computing environment, cause a method to be performed, the method comprising:

a) receiving, as input, a message comprising message elements, each message element modulated according to a modulation scheme comprising predetermined modulation levels;
b) providing, as output, for each of the message elements, a likelihood that the message element is faulted; and
c) providing, as further output, for each message element, a most probable correct version of each faulted message element.

16. The media of claim 15, the method further comprising:
a) determining, or receiving, as further input, for each message element, a modulation quality, wherein the modulation quality of the message element is determined according to a modulation of the message element and a signal-to-noise ratio of the message element.

17. The media of claim 15, the method further comprising:
a) determining a particular number of message elements that are determined, by the AI model, to be likely of being faulted;
b) determining whether the particular number of likely faulted message elements exceeds a predetermined threshold, and if so, providing, as further output, a recommendation recommending to request a retransmission of the message.

18. A method for a computer, containing an artificial intelligence model, to correct a faulted message comprising message elements, the method comprising:
a) determining, according to a modulation of the message elements, which message elements of the faulted message are likely faulted;
b) sequentially preparing a plurality of altered messages, wherein each altered message comprises the message with one of the likely faulted message elements altered to a different modulation; and
c) determining whether each of the altered messages is faulted.

19. The method of claim 18, wherein:
a) the determining whether each of the altered messages is faulted comprises comparing the altered message, or a hash or digest thereof, to an error-detection code embedded in or associated with the message; and
b) determining that the altered message is faulted if the altered message, or the hash or digest thereof, fails to agree with the error-detection code.

20. The method of claim 18, further comprising:
a) if all of the altered messages are faulted, providing a recommendation recommending to request a retransmission of the message.

* * * * *